United States Patent
Sun et al.

(10) Patent No.: US 9,065,634 B2
(45) Date of Patent: Jun. 23, 2015

(54) METHOD AND APPARATUS FOR SELECTIVE ACKNOWLEDGEMENT OF PACKETS FROM AN ACCESS PROBE

(71) Applicant: Qualcomm Incorporated, San Diego, CA (US)

(72) Inventors: Jing Sun, San Diego, CA (US); Rashid Ahmed Akbar Attar, San Diego, CA (US); Ravindra Manohar Patwardhan, San Diego, CA (US); Christopher Gerard Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 13/758,666

(22) Filed: Feb. 4, 2013

(65) Prior Publication Data

US 2013/0268820 A1    Oct. 10, 2013

Related U.S. Application Data

(60) Provisional application No. 61/653,397, filed on May 30, 2012, provisional application No. 61/620,369, filed on Apr. 4, 2012.

(51) Int. Cl.
*H04L 1/18* (2006.01)
*H04L 1/08* (2006.01)
*H04L 1/16* (2006.01)

(52) U.S. Cl.
CPC .......... *H04L 1/08* (2013.01); *H04L 1/1614* (2013.01); *H04L 1/1685* (2013.01); *H04L 1/1809* (2013.01); *H04L 1/1864* (2013.01)

(58) Field of Classification Search
CPC .................................. H04L 1/18; H03M 13/00
USPC ........................................ 714/749, 750, 748
See application file for complete search history.

(56) References Cited

U.S. PATENT DOCUMENTS 5,815,506 A    9/1998   Gokhale
6,771,659 B1   8/2004   Parantainen et al.
(Continued)

FOREIGN PATENT DOCUMENTS

EP    1944897 A1    7/2008

OTHER PUBLICATIONS

International Search Report and Written Opinion—PCT/US2013/034458—ISA/EPO—Jun. 21, 2013.
(Continued)

*Primary Examiner* — Esaw Abraham
(74) *Attorney, Agent, or Firm* — James Hunt Yancey Jr.; Stanton Braden

(57) ABSTRACT

Aspects of the present disclosure are directed to apparatuses and methods capable of selective acknowledgement of packets from an access probe. In one aspect, an apparatus includes: a transceiver configured to receive a set of frames associated with an access probe message from a wireless node, wherein the access probe message includes a plurality of frames, and the set of frames comprises a subset of the plurality of frames; and a processing system configured to generate a selective acknowledgement message based on a determination of whether each frame in the set of frames is received correctly. The acknowledgement includes an indication of receipt for at least one frame in the set of frames. Other aspects, embodiments, and features are also claimed and described.

38 Claims, 14 Drawing Sheets

(56) References Cited

U.S. PATENT DOCUMENTS

| | | | |
|---|---|---|---|
| 7,099,273 B2* | 8/2006 | Ha et al. | 370/229 |
| 7,408,913 B2* | 8/2008 | Khan | 370/345 |
| 7,586,948 B2 | 9/2009 | Hiddink et al. | |
| 7,664,085 B2* | 2/2010 | Waxman | 370/338 |
| 7,907,614 B2* | 3/2011 | Fischer et al. | 370/394 |
| 7,945,835 B2* | 5/2011 | Roh et al. | 714/748 |
| 8,102,804 B2* | 1/2012 | Noh et al. | 370/329 |
| 8,369,257 B2* | 2/2013 | Chu et al. | 370/312 |
| 8,411,560 B2* | 4/2013 | Samuels et al. | 370/229 |
| 8,705,422 B2* | 4/2014 | Adachi et al. | 370/310 |
| 2010/0269006 A1 | 10/2010 | Jang et al. | |
| 2011/0029831 A1 | 2/2011 | Lee et al. | |

OTHER PUBLICATIONS

Wang S., et al., "Harmonized Proposal on 1x Rev. F R-Each Enhancements," C30-20120416-027, Apr. 16, 2012, 4 slides.

* cited by examiner

METHOD AND APPARATUS FOR SELECTIVE ACKNOWLEDGEMENT OF PACKETS FROM AN ACCESS PROBE

PRIORITY CLAIMS

This application claims priority to and the benefit of provisional patent application No. 61/653,397, entitled "METHOD AND APPARATUS FOR SELECTIVE ACKNOWLEDGEMENT OF PACKETS FROM AN ACCESS PROBE," filed in the United States Patent Office on May 30, 2012; and provisional patent application No. 61/620,369, entitled "Method and apparatus for selective acknowledgement of packets from an access probe," filed in the United States Patent Office on 4 Apr. 2012. Both of said applications are incorporated herein by reference as if fully set forth below in their entireties and for all applicable purposes.

TECHNICAL FIELD

The technology discussed in this patent application relates generally to wireless communication, and more specifically, to a method and apparatus for selective acknowledgement of packets from an access probe.

BACKGROUND

Wireless communications systems are widely deployed to provide various types of communication content such as voice, video, packet data, messaging, broadcast, and so on. These systems may be accessed by wireless devices of multiple users sharing the available system resources (e.g., time, frequency, and power). Examples of such wireless communications systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

In a system such as a cdma2000 1x system, when a wireless device is attempting to either access the system or respond to a page from a base station, the wireless device may need to transmit one or more series of access probes, which may be referred to as access probe sequences. Each access probe is transmitted over an access channel, which is a reverse CDMA channel used by the wireless device to communicate short signaling message exchanges with the base station. These short signaling message exchanges may be related to such operations as call originations, responses to pages, registrations, and connection setups. Further, where a technique such as data-over-signaling is used, an access probe may be used to ferry traffic data, which is data normally transmitted over a data channel.

In data-over-signaling, one or more access probe sequences may be used to transmit an amount of traffic data using the access channel. In cases where access probes are used for data-over-signaling, the access channel may be used to carry data in addition to short signaling message exchanges. Typically, the amount of traffic data to be communicated is small enough to be transmitted using one access probe. Because data-over-signaling transmits traffic data over a signaling channel such as the access channel, it does not require any traffic channels to be setup. Through the use of data-over-signaling, connection setup may be avoided. However, the average size of the access probes may be increased because of additional information in the payload of each access probe.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure are directed to apparatuses and methods capable of selective acknowledgement of packets from an access probe. In one aspect, a method for wireless communications is provided. The method includes: transmitting, to a wireless node, an access probe message including a plurality of frames; determining whether an acknowledgement associated with a subset of frames in the plurality of frames is received from the wireless node, wherein the acknowledgement includes an indication of receipt by the wireless node for at least one frame in the subset of frames; and retransmitting the plurality of frames based on the receipt of the acknowledgement.

In another aspect, a method for wireless communications is provided. The method includes: receiving a set of frames associated with an access probe message from a wireless node, wherein the access probe message includes a plurality of frames, and the set of frames includes a subset of the plurality of frames; determining whether each frame in the set of frames is received correctly; and generating an acknowledgement based on the determination, wherein the acknowledgement includes an indication of receipt for at least one frame in the set of frames.

In another aspect, a method for wireless communications is provided. The method includes: receiving, from a wireless node, a capability message that the wireless node supports selective acknowledgement of receipt of transmission of a subset of frames in a plurality of frames associated with an access probe message; transmitting, to a wireless node, the plurality of frames along with an indication of support for selective retransmission of the plurality of frames based on a selective acknowledgment message; determining whether a first selective acknowledgement message is received from the wireless node, wherein the first acknowledgement message includes an indication of receipt by the wireless node for at least one frame in the subset of frames; and retransmitting the plurality of frames based on the receipt of the first selective acknowledgement message.

In another aspect, a method for wireless communications is provided. The method includes: receiving a set of frames associated with an access probe message from a wireless node, wherein the access probe message includes a plurality of frames, and the set of frames includes a subset of the plurality of frames; generating a selective acknowledgement message based on a determination of whether each frame in the set of frames is received correctly, wherein the acknowledgement includes an indication of receipt for at least one frame in the set of frames; and, transmitting the selective acknowledgement message along with an identifier assigned to the wireless node to allow tracking of a response, by the wireless node, to the selective acknowledgement message.

In another aspect, an apparatus for wireless communications is provided. The apparatus includes: means for receiving, from a wireless node, a capability message that the wireless node supports selective acknowledgement of receipt of transmission of a subset of frames in a plurality of frames associated with an access probe message; means for transmitting, to a wireless node, the plurality of frames along with an indication of support for selective retransmission of the plurality of frames based on a selective acknowledgment message; means for determining whether a first selective acknowledgement message is received from the wireless node, wherein the first acknowledgement message includes an indication of receipt by the wireless node for at least one frame in the subset of frames; and means for retransmitting the plurality of frames based on the receipt of the first selective acknowledgement message.

In another aspect, an apparatus for wireless communications is provided. The apparatus includes: means for receiving a set of frames associated with an access probe message from a wireless node, wherein the access probe message includes a plurality of frames, and the set of frames includes a subset of the plurality of frames; means for generating a selective acknowledgement message based on a determination of whether each frame in the set of frames is received correctly, wherein the acknowledgement includes an indication of receipt for at least one frame in the set of frames; and, means for transmitting the selective acknowledgement message along with an identifier assigned to the wireless node to allow tracking of a response, by the wireless node, to the selective acknowledgement message.

In another aspect, an apparatus for wireless communications is provided. The apparatus includes a transceiver configured to: receive, from a wireless node, a capability message that the wireless node supports selective acknowledgement of receipt of transmission of a subset of frames in a plurality of frames associated with an access probe message; transmit, to a wireless node, the plurality of frames along with an indication of support for selective retransmission of the plurality of frames based on a selective acknowledgment message; and a processing system configured to determine whether a first selective acknowledgement message is received from the wireless node, wherein the first acknowledgement message includes an indication of receipt by the wireless node for at least one frame in the subset of frames, wherein the transceiver is further configured to retransmit the plurality of frames based on the receipt of the first selective acknowledgement message.

In another aspect, an apparatus for wireless communications is provided. The apparatus includes: a transceiver configured to receive a set of frames associated with an access probe message from a wireless node, wherein the access probe message includes a plurality of frames, and the set of frames includes a subset of the plurality of frames; and a processing system configured to generate a selective acknowledgement message based on a determination of whether each frame in the set of frames is received correctly, wherein the acknowledgement includes an indication of receipt for at least one frame in the set of frames, wherein the transceiver is configured to transmit the selective acknowledgement message along with an identifier assigned to the wireless node to allow tracking of a response, by the wireless node, to the selective acknowledgement message.

In another aspect, a computer-program product including a machine-readable storage medium that includes: code for receiving, from a wireless node, a capability message that the wireless node supports selective acknowledgement of receipt of transmission of a subset of frames in a plurality of frames associated with an access probe message; code for transmitting, to a wireless node, the plurality of frames along with an indication of support for selective retransmission of the plurality of frames based on a selective acknowledgment message; code for determining whether a first selective acknowledgement message is received from the wireless node, wherein the first acknowledgement message includes an indication of receipt by the wireless node for at least one frame in the subset of frames; and code for retransmitting the plurality of frames based on the receipt of the first selective acknowledgement message.

In another aspect, a computer-program product for wireless communications including a machine-readable storage medium that includes: code for receiving a set of frames associated with an access probe message from a wireless node, wherein the access probe message includes a plurality of frames, and the set of frames includes a subset of the plurality of frames; code for generating a selective acknowledgement message based on a determination of whether each frame in the set of frames is received correctly, wherein the acknowledgement comprises an indication of receipt for at least one frame in the set of frames; and code for transmitting the selective acknowledgement message along with an identifier assigned to the wireless node to allow tracking of a response, by the wireless node, to the selective acknowledgement message.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

These and other sample aspects of the disclosure will be described in the detailed description that follow, and in the accompanying drawings, wherein.

Figure 1:
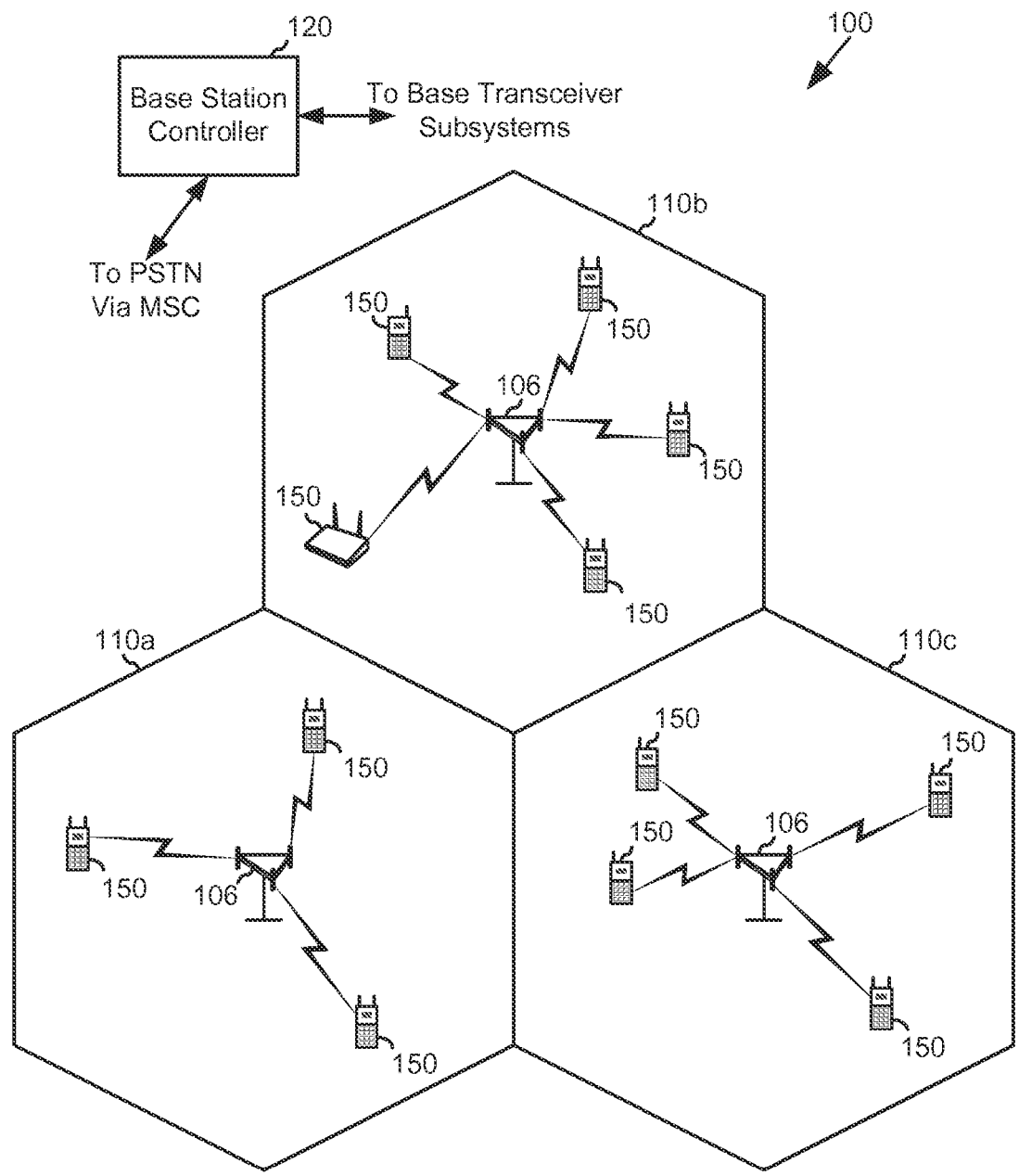
FIG. 1 is a block diagram of a wireless communications system in which various aspects of a selective acknowledgement approach for access probes may be implemented.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

In the following description, reference is made to the accompanying drawings in which is shown, by way of illustration, specific approaches in which the disclosure may be practiced. The approaches are intended to describe aspects of the disclosure in sufficient detail to enable those skilled in the art to practice the invention. Other approaches may be utilized, and changes may be made to the disclosed approaches without departing from the scope of the disclosure. The following detailed description is not to be taken in a limiting sense, and the scope of the disclosure is defined only by the appended claims.

Elements described herein may include multiple instances of the same element. These elements may be generically indicated by a numerical designator (e.g., "110") and specifically indicated by the numerical indicator followed by an alphabetic designator (e.g., "110A") or a numeric indicator proceeded by a "dash" (e.g., "110-1"). For ease of following the description, for the most part element number indicators begin with the number of the drawing on which the elements are introduced or most fully discussed.

The following description provides examples, and is not limiting of the scope, applicability, or configuration set forth in the claims. Changes may be made in the function and arrangement of elements discussed without departing from the spirit and scope of the disclosure. Various aspects may omit, substitute, or add various procedures or components as appropriate. For instance, the methods described may be performed in an order different from that described, and various steps may be added, omitted, or combined. Also, features described with respect to certain aspects may be combined in other aspects.

The discussions herein may involve CDMA and Evolution-Data Optimized (EV-DO) protocols and systems as one example in order to indicate additional details of some aspects of the disclosed approaches. Another example is a complementary device enhancement known as simultaneous (1X) Voice and (EV-DO) Data (SV-DO) that enables CDMA2000 devices to access EV-DO packet data services while in an active 1X circuit-switch voice call. However those of ordinary skill in the art will recognize that aspects of the disclosed approach may be used and included in many other wireless communication protocols and systems.

FIG. 1 is a block diagram illustrating an example of a wireless communications system 100. The system 100 includes base stations 106, wireless devices 150, and a base station controller 120. The system 100 may be capable of supporting operation on multiple carriers (waveform signals of different frequencies). Multi-carrier transmitters may transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 106 may wirelessly communicate with the wireless devices 150 via a base station antenna. The base stations 106 are configured to communicate with the wireless devices 150 under the control of the controller 120. Each of the base stations 106 sites can provide communication coverage for a respective geographic area. The coverage area 110 for each base station 106 may be identified as 110-$a$, 110-$b$, or 110-$c$. The coverage area 110 for the base stations 106 may be divided into sectors (not shown, but making up only a portion of the coverage area). The base stations 106 of the system 100 may include base stations of different types (e.g., macro, micro, and/or pico base stations).

The wireless devices 150 may be dispersed throughout the coverage areas 110. The wireless devices 150 may be referred to as mobile stations, wireless devices, access terminals (ATs), user equipments (UEs) or subscriber units. The wireless devices 150 may include cellular phones and wireless communications devices, but may also include personal digital assistants (PDAs), televisions, entertainment devices, other handheld devices, netbooks, notebook computers, etc.

Figure 2:
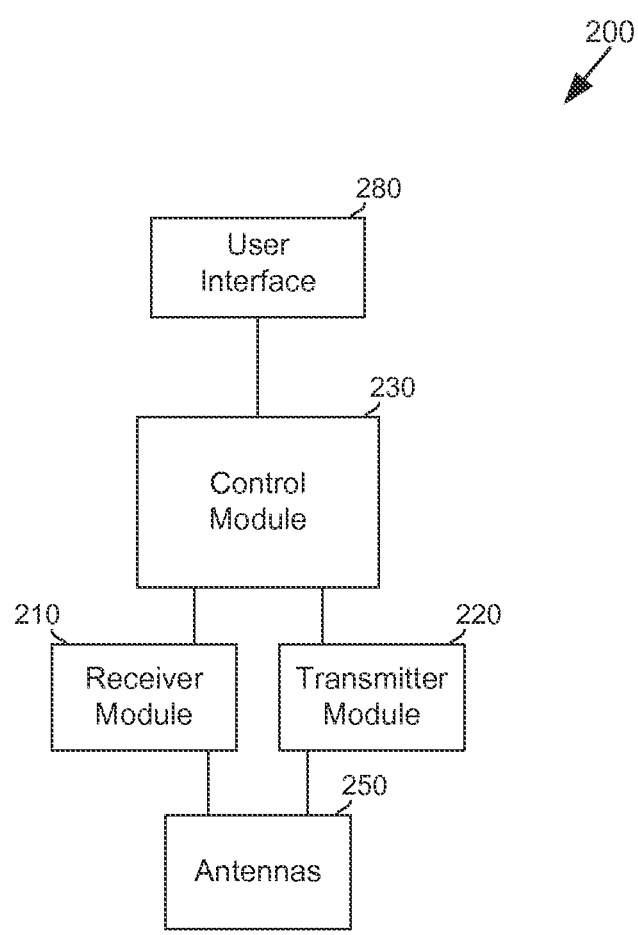
FIG. 2 is a block diagram of an exemplary wireless device configured in accordance with various aspects of the disclosed approach in which various aspects of the selective acknowledgement approach for access probes may be implemented.

FIG. 2 is a block diagram illustration of an exemplary wireless device 200 that may represent one of the wireless devices 150. The wireless device 200 may have any number of different configurations, such as personal computers (e.g., laptop computers, netbook computers, tablet computers, etc.), cellular telephones, PDAs, digital video recorders (DVRs), internet appliances, gaming consoles, e-readers, etc. The wireless device 200 may also have a configuration such as water meters, power meters, monitoring devices, etc. The wireless device 200 may have a mobile configuration, having an internal power supply (not shown), such as a battery, to facilitate mobile operation. The wireless device 200 includes a group of two or more antennas 250, which may be used in the transmission/reception of wireless communications to/from the wireless device 200. In some aspects of the disclosure, the group of antennas 250 include a primary antenna and one or more secondary antennas, with the primary antenna used for transmission and reception of wireless communications on a wireless communications channel, and the one or more secondary antennas used for reception of wireless communications on the same wireless communications channel in order to provide RxD. In some other aspects, the one or more secondary antennas may be used for reception of wireless communications on a different wireless communications channel. In some devices, wireless communications may be received on more than two wireless communications channels, with such devices including additional antennas as necessary to receive wireless communications on three or more different wireless communications channels.

A receiver module 210 and a transmitter module 220 are coupled to the group of antennas 250. The receiver module 210 receives signals from the group of antennas, demodulates and processes the signals, and provides the processed signals to a control module 230 (e.g., a processing system). Similarly, the transmitter module 220 receives signals from the control module 230, processes and modulates the signals, and transmits the processed and modulated signals using the group of antennas 250. In some aspects of the disclosure, the transmitter module 220 and the receiver module 210 may be incorporated into a single transceiver module. The control module 230 performs processing tasks related to the operation of the wireless device 200, and may be coupled to a user interface 280 that allows a user of the wireless device 200 to select various functions, control, and interact with the wireless device 200. The various components the wireless device 200 may be in communication with some or all of the other components of the wireless device 200 via one or more busses (not shown), for example.

Figure 3:
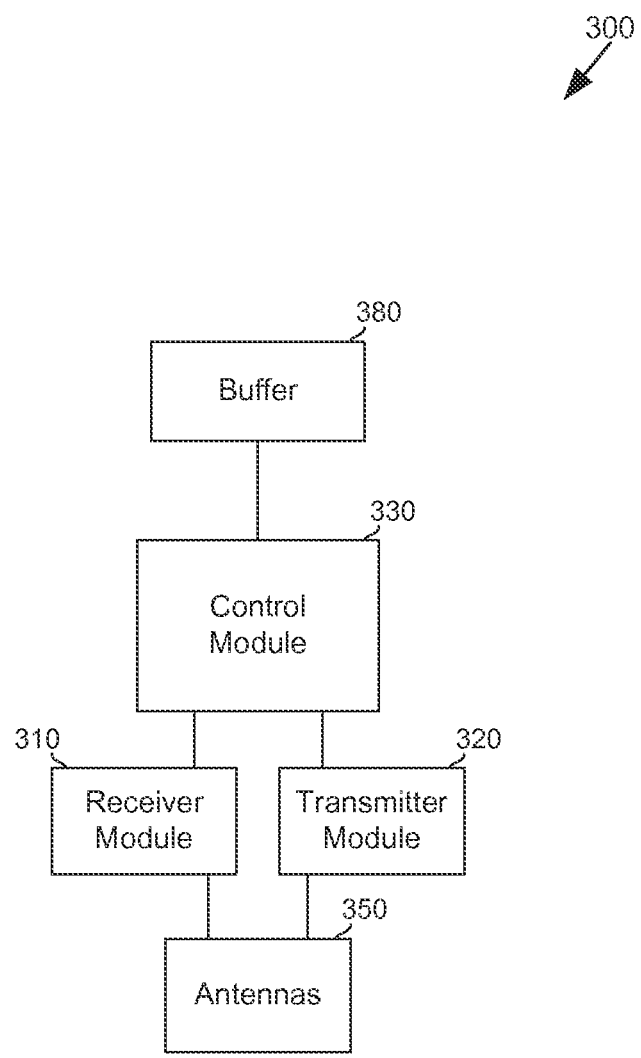
FIG. 3 is a block diagram of an exemplary base station configured in accordance with various aspects of the disclosed approach in which various aspects of the selective acknowledgement approach for access probes may be implemented.

FIG. 3 is a block diagram illustration of an exemplary base station 300 that may represent one of the base stations 150. The base station 300 may include a group of two or more antennas 350, which may be used in the transmission/reception of wireless communications to/from the base station 300. In some aspects of the disclosure, the group of antennas 350 includes a plurality of antennas. In some other aspects, the plurality of antennas may be used for reception of wireless communications on different wireless communications channels. In some devices, wireless communications may be received on more than two wireless communications channels, with such devices including additional antennas as necessary to receive wireless communications on three or more different wireless communications channels.

A receiver module 310 and a transmitter module 320 are coupled to the group of antennas 350. The receiver module 310 receives signals from the group of antennas, demodulates and processes the signals, and provides the processed signals to a control module 330. Similarly, the transmitter module 320 receives signals from the control module 330, processes and modulates the signals, and transmits the processed and modulated signals using the group of antennas 350. In some aspects of the disclosure, the transmitter module 320 and the receiver module 310 may be incorporated into a single transceiver module. The control module 330 performs processing tasks related to the operation of the base station 300, and may be coupled to a buffer 380 that allows a user of the base station 300 to select various functions, control, and interact with the base station 300. The various components the base station 300 may be in communication with some or all of the other components of the base station 300 via one or more busses (not shown), for example.

Figure 4:
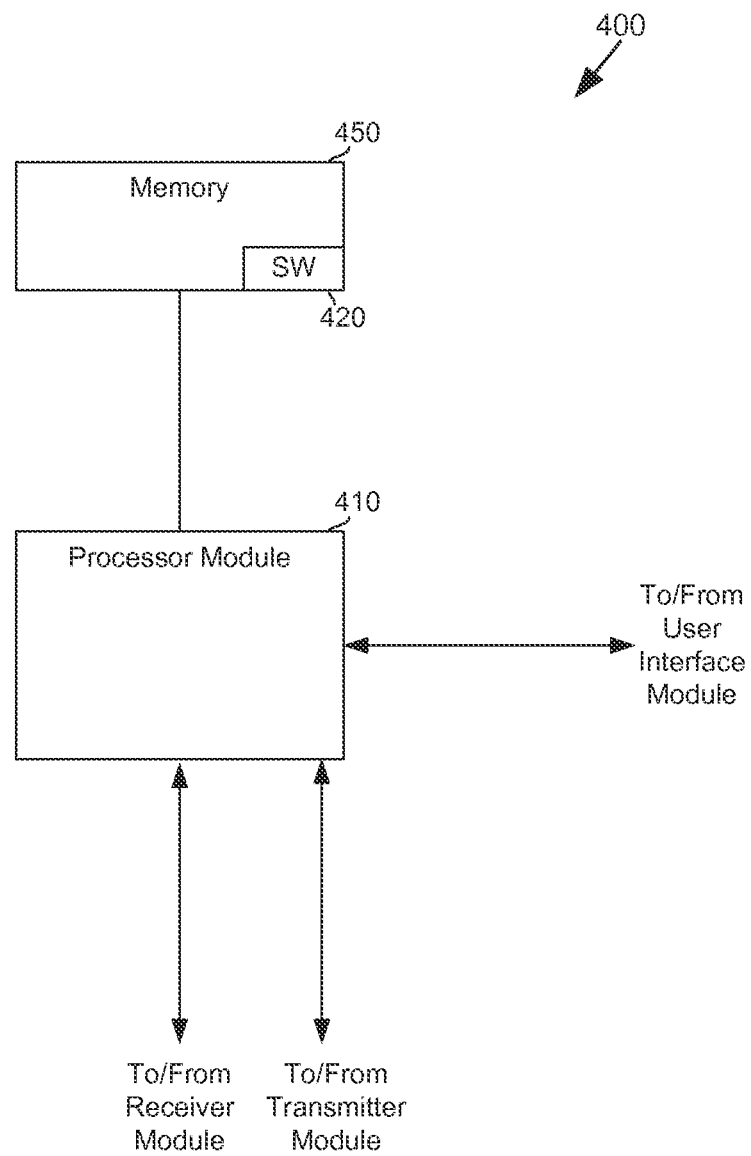
FIG. 4 is a block diagram of an exemplary control module of the wireless device of FIG. 2 according to some embodiments.

FIG. 4 illustrates a control module 400 that may be used to implement the control module 220 of the wireless device 200 and the control module 320 of the base station 300 according to some aspects of the disclosed approach. The control module 400 includes a processor module 410. The control module 400 also may include a memory 450. As non-limiting examples, the memory 450 may include Random Access Memory (RAM), Read-Only Memory (ROM), Non-Volatile Random Access Memory (NVRAM), or combinations thereof. The memory 450 may store computer-readable, computer-executable software code 420 containing instructions that are configured to, when executed, cause the processor module 410 to perform various functions of the wireless device 200 (e.g., call processing, message routing, execution of applications, etc.). Alternatively, the software code 420 may not be directly executable by the processor module 410 but may be configured to cause the processor module 410 (e.g., when compiled and executed) to perform functions described herein, such as the algorithms and processes described herein.

The software code 420 may also, when executed in the wireless device 200, cause the processor module 410 to track and record historical usage data relating to, for example, the communications characteristics of the packets received and transmitted by the wireless device 200. The historical communications data may be stored in the memory 450 and accessed and updated as needed by the processor module 410. The software code 420 may also, when executed in the base station 300, cause the processor module 410 to receive and decode access probes, for example, from the access probe sequences transmitted by the wireless device 200. The access probe data may be stored in the memory 450 and accessed and updated as needed by the processor module 410.

The processor module 410 may include an intelligent hardware device, e.g., a central processing unit (CPU) such as those made by Qualcomm Incorporated (Snapdragon), Intel® Corporation, or AMD®, a microcontroller, an application specific integrated circuit (ASIC), etc. For the wireless device 200, the processor module 410 may include a speech encoder (not shown) configured to receive audio via a microphone, convert the audio into packets representative of the received audio, provide the audio packets to the transmitter module 220, and provide indications of whether a user is speaking. The processor module 410 may execute one or more applications that a user may access, through the user interface 280, to generate digital content that is to be transmitted from the wireless device 200. Such digital content may include email or text message communications, to name but two examples, that the processor module 410 may convert into data packets, and provide the data packets to the transmitter module 220. For the base station 300, the processor module 410 may be configured to decode one or more access probe frames to reconstruct an access probe, and also determine if each access probe frame is received properly using various error checking methods, including any error checking methods disclosed herein. Further, error correction techniques may further be used to reduce the need to retransmit access probe frames that may be corrected through the use of such error correction approaches.

Figure 5:
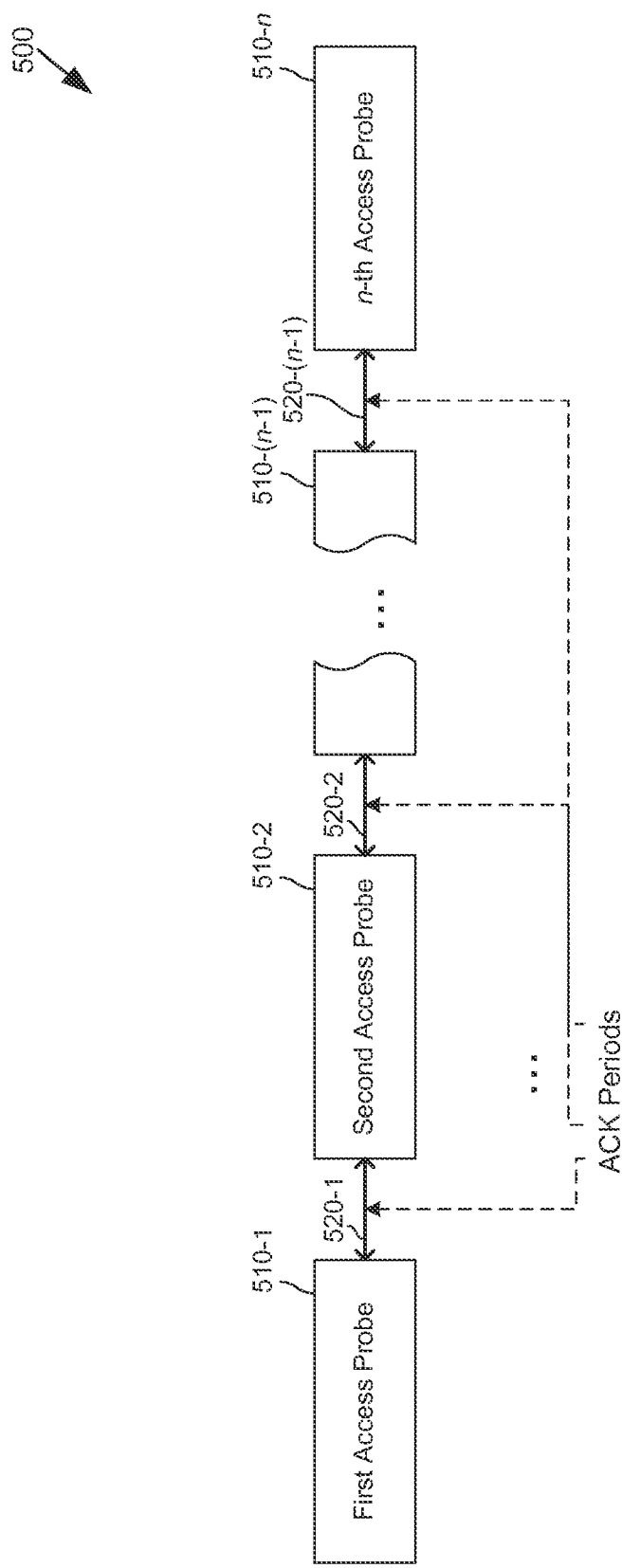
FIG. 5 is a data diagram for an access probe sequence used in the wireless network of FIG. 1 according to some embodiments.

As discussed above, a wireless device such as the wireless device 200 may transmit an access probe as part of an access probe sequence to a base station such as the base station 300 in response to a page from the base station 300 or to access the network. FIG. 5 illustrates an access probe sequence 500 with a first access probe 510-1 through an n-th access probe 510-$n$. Typically, the wireless device 200 may control transmit power for sending an access probe in an access sequence. Initially, a relatively lower power access probe such as access probe 510-1 is transmitted. If an acknowledgement is not received within a certain period of time, illustrated as an acknowledgement period 510-1 in a plurality of acknowledgement periods 510-1 through 510-($n$-1), another access probe such as the access probe 510-2 is transmitted using a higher power. In other words, the power used by the wireless device to transmit each access probe in the access probe sequence 500 escalates from a prescribed minimum transmit power until either an acknowledgement is received by the wireless device from the base station, or until a prescribed maximum transmit power is reached. One or more repetitions of an access probe sequence such as the access probe sequence 500 constitute an access attempt.

Figure 6:
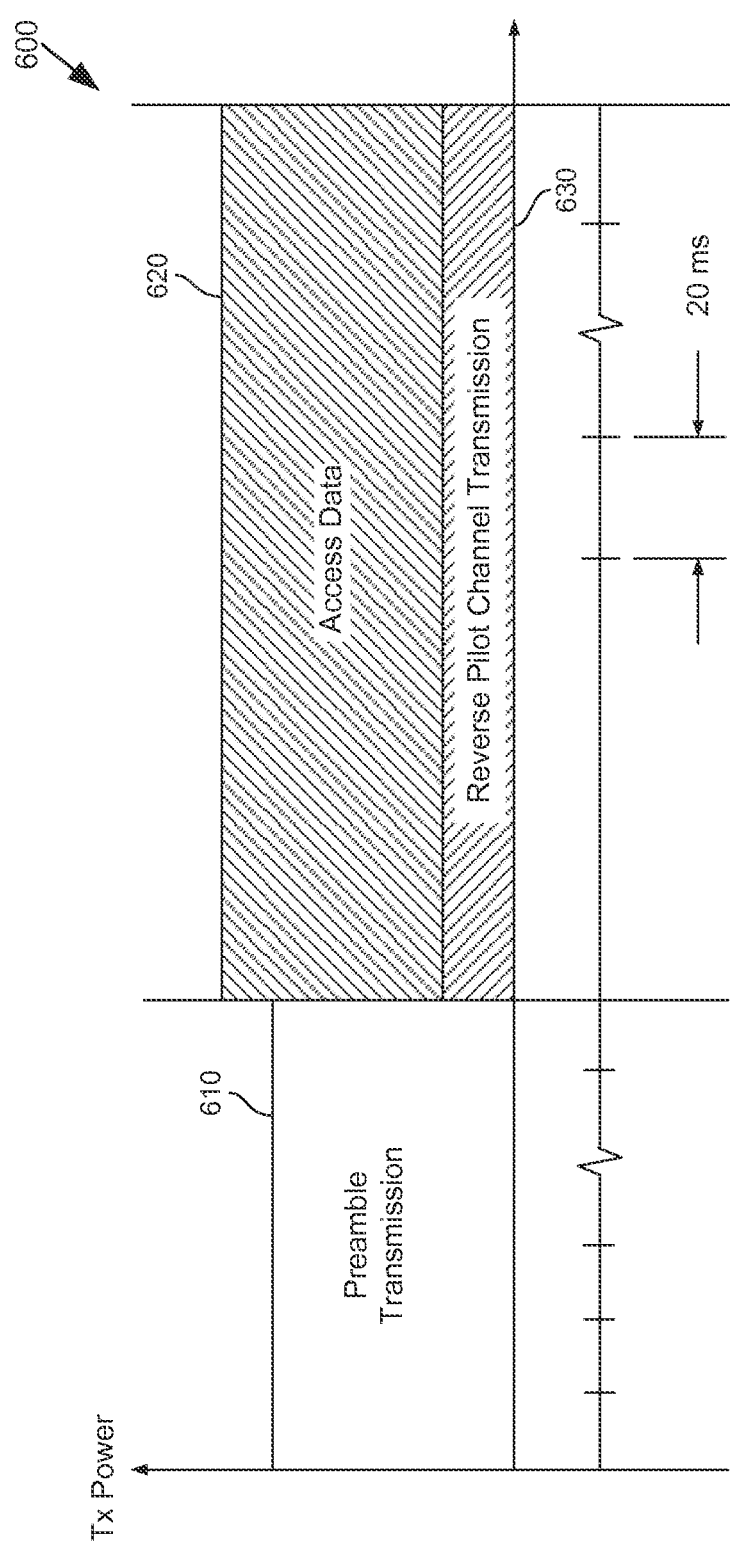
FIG. 6 is a data diagram for an access probe in the access probe sequence according to some embodiments.
Figure 7:
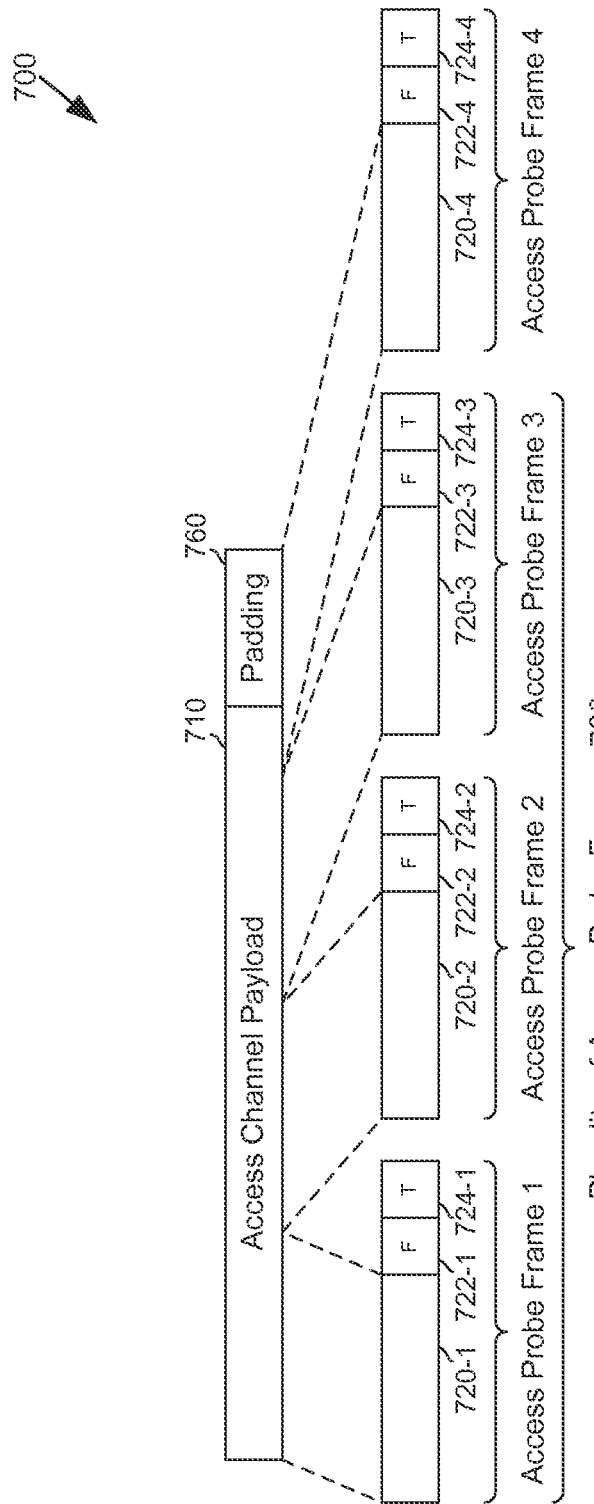
FIG. 7 is a data diagram for an access channel transmission according to some embodiments.

FIG. 6 illustrates a single access probe 600 that may represent one access probe in the access probe sequence 500, where each access channel transmission consists of a preamble 610 and a message, which may include access data 620 and signaling data 630 (e.g., reverse pilot channel transmission). Also referring to FIG. 7, which illustrates an access channel transmission 700 having an access channel payload 710 and a padding 760 broken down into a plurality of access probe frames 730 that may be used to transmit an access probe such as the single access probe 600. The access probe 600 transmission is an integer number of frames in length and carries one access channel message. As illustrated, the plurality of access probe frames includes an access probe frame data portion 720-1 through access probe frame data portion 720-4. Each access probe frame data portion 720-1 through access probe frame data portion 720-4 includes a respective frame quality indicator (F), illustrated as frame quality indicator 722-1 through frame quality indicator 722-4. In one aspect of the disclosed approach, the frame quality indicator may include an error detection code such as a cyclic redundancy code (CRC), which is a class of linear error detecting codes that generate parity check bits by determining a remainder of a polynomial division. Each access probe frame data portion 720-1 through access probe frame data portion 720-4 also includes a respective encoder tail bit (T), illustrated as encoder tail bit 724-1 through encoder tail bit 724-4. In one aspect of the disclosed approach, the encoder tail bits are a fixed sequence of bits added to the end of a block of data to reset the convolutional encoder to a known state. As a non-limiting example, in a cdma2000 1x system, access probe data is transmitted in frames in a reverse enhanced access channel, and each frame is individually encoded and includes a CRC. A base station may attempt to decode each frame separately and use the CRC to check if the decoding is successful. As used herein, a frame is said to be received correctly or successfully if the frame has been both received and decoded properly (e.g., the decoded frame passes the CRC check). Further, an access probe is said to be received correctly or successfully if the access probe has been reconstructed completely from the correctly received frames.

Typically, when the wireless device 200 transmits an access probe such as the plurality of access probe frames 730, the base station 300 may try to detect and decode the plurality of access probe frames 730, and send out an acknowledgement to the wireless device 200 when the access probe is correctly received. If only part of the data in the access probe may be correctly received by the base station 300, while the rest cannot, an acknowledgement will not be transmitted. If no acknowledgement is received by the wireless device 200, the entire data will be transmitted again by the wireless device 200 in the next access probe transmission. This is a waste of airlink resources. Further, the redundant transmission may unnecessarily increase interference at the base station 300, thus deteriorate the reverse link channel for other wireless devices.

In one aspect of the disclosed approach, as further described herein, the base station 300 does not wait for an access probe message to be decoded before sending out an acknowledgement. Instead, the base station 300 may determine if a subset of the plurality of frames from the received access probe may be decoded, and the base station 300 may send an acknowledgement indicating those packets are decoded. This acknowledgement of the correct receipt of the subset of the plurality of packets will be referred to herein as a "selective acknowledgement" (SACK) message.

Figure 8:
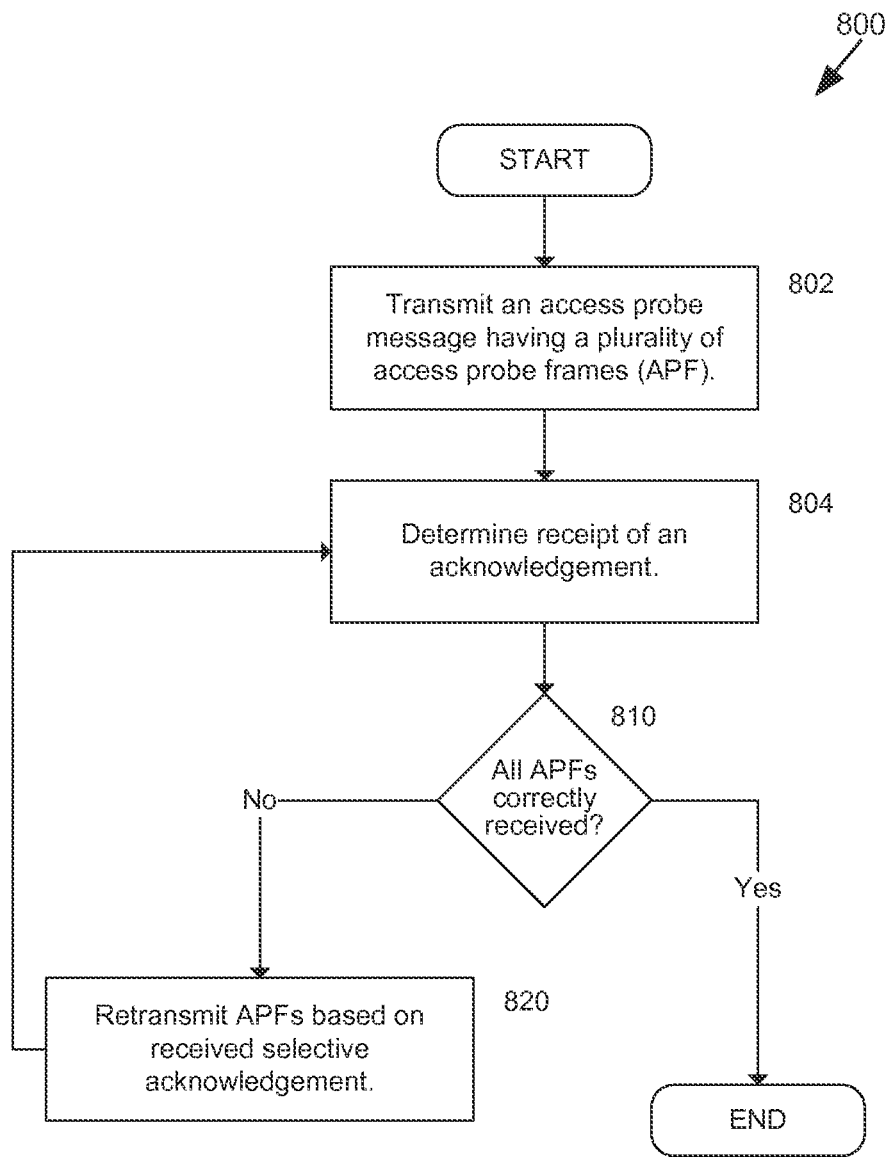
FIG. 8 is a flow diagram of a selective acknowledgement approach for access probes for the wireless device of FIG. 2 according to some embodiments.
Figure 9:
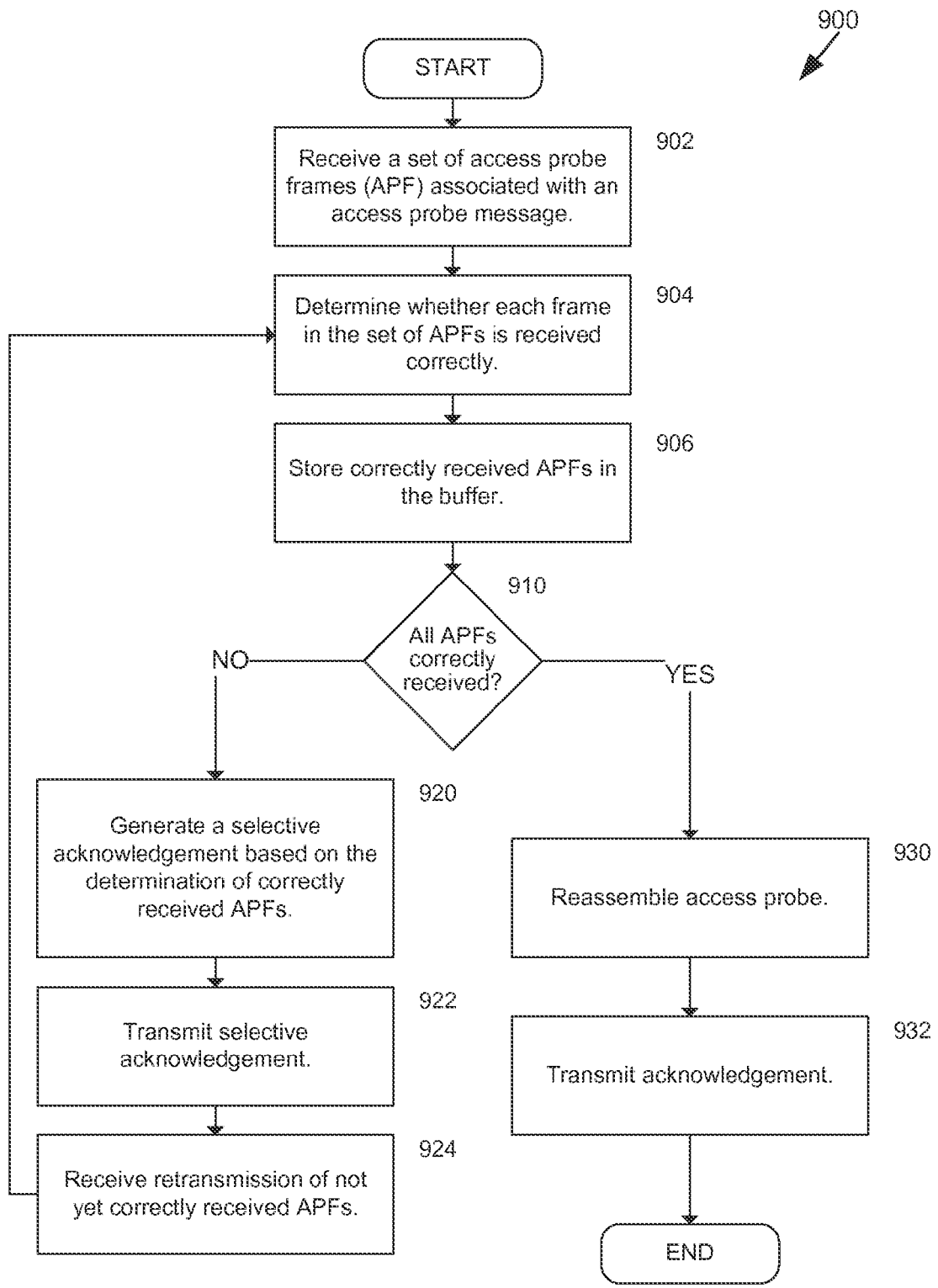
FIG. 9 is a flow diagram of a selective acknowledgement approach for access probes for the base station of FIG. 3 according to some embodiments.

Referring to FIG. 8, which illustrates a selective access probe acknowledgement process 800 for a wireless device such as the wireless device 200; FIG. 9, which illustrates a selective access probe acknowledgement process 900 for a base station such as the base station 300; and FIG. 10, which illustrates a non-limiting example of a call flow 1000 for an access probe transmission between the wireless device 200 and the base station 300; various aspects of the access probe acknowledgement approach will be described herein.

Figure 10:
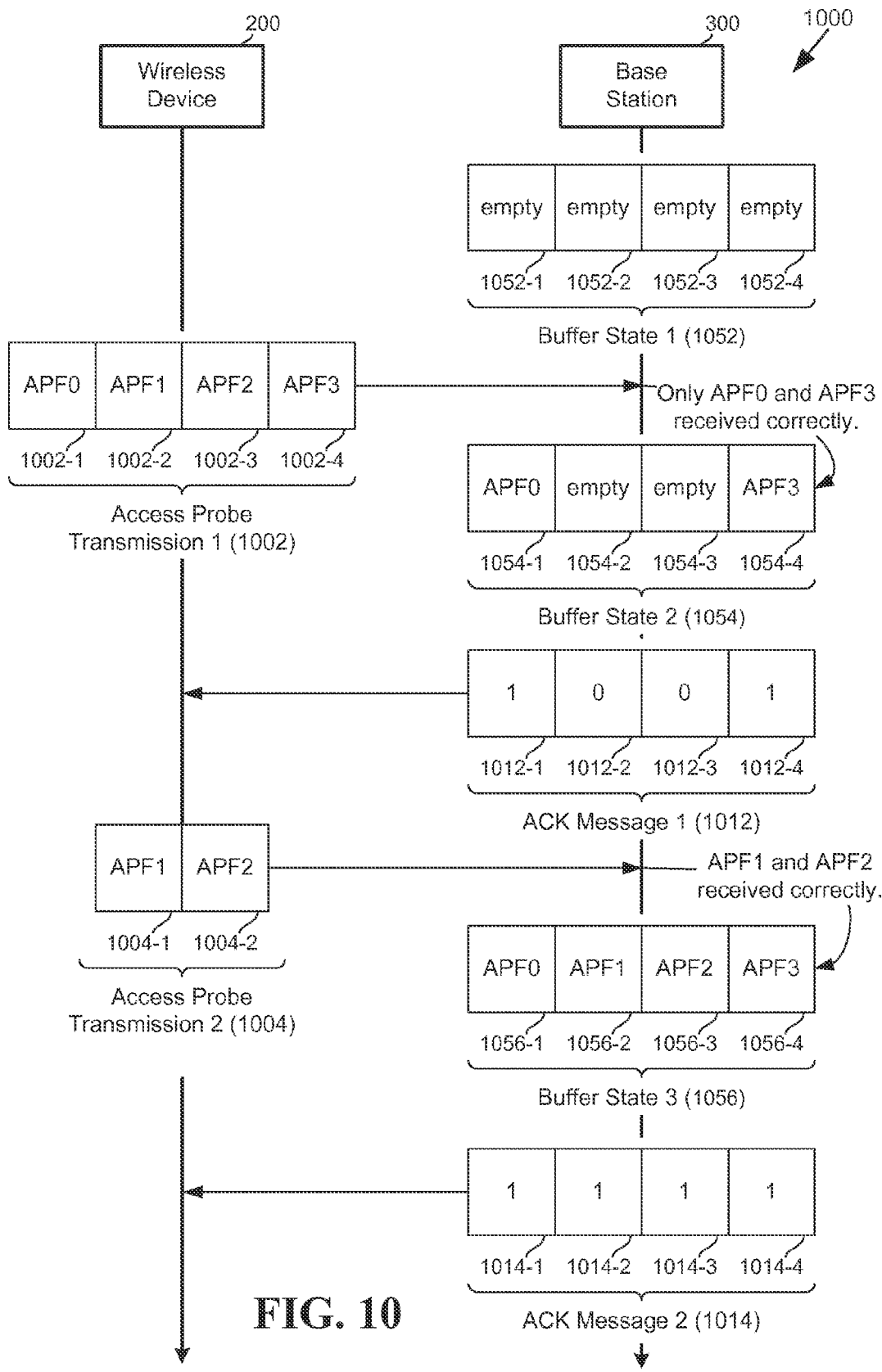
FIG. 10 is a message exchange flow diagram illustrating an example of the operation of FIGS. 8 and 9 according to some embodiments.

At 802, the wireless device 200 may transmit an access probe message in an access probe transmission 1 1002, as illustrated in FIG. 10, having a plurality of access probe frames (APF) APF0 1002-1 through APF3 1002-4 to the base station 300.

At 902, the base station 300 may receive a set of frames associated with the access probe message 1002 from the wireless node 200. The base station 300 may also receive an indication or message transmitted from the wireless node 200 that it supports the selective acknowledgement approach disclosed herein. Operations may then continue at 904.

At 904, the base station 300 may determine whether each frame in the set of frames is received correctly. As illustrated in FIG. 10, although the plurality of access probe frames APF0 1002-1 through APF3 1002-4 has been transmitted by the wireless node 200, the set of frames that is correctly received only includes access probe frames APF0 and APF3. The set of frames constitute a subset of the plurality of access probe frames APF0 1002-1 through APF3 1002-4. As described above, the access probe frames APF0 and APF3 are said to be correctly received because the base station has determined that these frames have decoded properly based on the base station 300 checking the CRC associated with each frame. Once the base station 300 determines which access probe frames have been received correctly, operation continues at 906.

At 906, the base station 300 may store the correctly received access probe frames APF0 and APF3 in a buffer such as the buffer 380. For example, the buffer may have a number of allocations or slots for storing the received access probe frames. As illustrated by buffer state 2 1054 in FIG. 10, the access probe frames APF0 and APF3 are stored in buffer slots 1054-1 and 1054-4, respectively, which previously was empty upon initialization as shown by buffer state 1 1052 having empty slots 1052-1 through 1052-4. In one aspect of the disclosed approach, the base station 300 saves slots for storing access probe frames that may be properly received in future retransmissions. For example, successful receipt of the retransmission access probe frames APF1 1002-2 and APF2 1002-3. In one aspect of the disclosed approach, the base station 300 may only need to buffer the correctly received access probe frames if it needs a temporary memory location to store the access probe frames before it may attempt to reassemble the access probe message. Further, although the buffer states are illustrated as having only four slots in FIG. 10, it should be apparent to those of ordinary skill in the art that a buffer having an arbitrary size may be used. Further still, multiple buffers may be used as necessary. The necessary buffer space for buffering each plurality of access probe frames may be determined by decoding a preamble of the access probe, such as the preamble 610 illustrated in FIG. 6.

At 910, the base station 300 may determine whether all access probe frames for an access probe has been correctly received and thus the access probe may be reassembled. If all access probe frames have not been correctly received, which means the access probe message may not be reassembled, then operations may continue at 920. Otherwise, if all access probe frames have been correctly received, then operation may continue at 930.

At 920, the base station 300 may generate an acknowledgement based on the determination at 904. In one aspect of the disclosed approach, the acknowledgement is a selective acknowledgement that includes an indication of receipt for only the set of frames in the plurality of frames that are correctly received. As illustrated in FIG. 10, the base station 300 may generate a selective acknowledgement message 1 1012 having a bitmask including bits 1012-1 through 1012-4, where bits 1012-1 and 1012-4 are each set to "1" to indicate that the access probe frames APF0 and APF3 have been correctly received by the base station 300. In another aspect of the disclosed approach, the selective acknowledgement message may identify only the access probe frame up to which the transmitted plurality of access probe frames have been correctly received by the base station 300. The wireless device 200 may then selectively retransmit only the access probe frames after the access probe frame identified in the selective acknowledgement message of the other aspect of the disclosed approach. In still yet another aspect of the disclosed approach, the selective acknowledgement message may identify only the frames that are still needed. In general, the selective acknowledgement message may optimize the retransmission (or partial retransmission) of the access probe frames by indicating to the wireless device 200 what access probe frames need to be retransmitted. Even more generally, the selective acknowledgement message may allow the wireless device 200 to avoid retransmission of all access probe frames upon the failure of a correct receipt of any one of the access probe frames. Once the selective acknowledgement has been generated, operations may then continue at 922.

At 922, the selective acknowledgement message 1 1012 is transmitted by the base station 300 to the wireless device 200. In one aspect of the disclosed approach, the selective acknowledgement may be transmitted in a page channel and may include the bitmap indicating exactly which access probe frames have been correctly received (i.e., received and decoded properly).

At 804, the wireless device 200 may determine whether an acknowledgement associated with a subset of frames in the plurality of frames may be received from the base station 300. As further described herein, after such a selective acknowledgement message is received at the wireless device 200, the access probe frames that have been correctly received by the base station 300 may not be transmitted in the next access probe. Therefore, the next access probe may only contain new information, and redundant transmission may be reduced or eliminated. As a result, future access probes may be shorter. The selective acknowledgement message is optional, in the sense that if the page channel is full, transmission of the selective acknowledgement message may be skipped. In this way, page channel capacity may not be affected. In other words, the transmission of other more critical channels, such as the paging channel, may not be disrupted. Further, if the selective acknowledgement message is not received, the wireless device 200 may transmit the entire data again in the next access probe. In the example illustrated in FIG. 10, the wireless station 200 may receive the selective acknowledgement message 1 1012 transmitted by the base station 300 at 910. Operation may then continue at 810.

At 810, the wireless device 200 may determine whether an acknowledgement associated with the plurality of frames is received from the base station 300. In one aspect of the disclosed approach, the acknowledgement message may be a selective acknowledgement message which indicates that not all access probe frames have been correctly received by the base station 300 (e.g., the selective acknowledgement message may identify only the access probe frames that have been correctly received). In this case, operations may continue at 820. In another aspect of the disclosed approach, the acknowledgement message may indicate that all access probe frames have been correctly received by the base station 300. In that case, operations may complete. In the example illustrated in FIG. 10, the wireless station 200 may receive the selective acknowledgement message 1 1012 transmitted by the base station 300 at 910, where the selective acknowledgement message 1 1012 is associated with a subset of the plurality of frames. Namely, the selective acknowledgement message 1 1012 indicates that the access probe frames APF0 1002-1 and APF3 1002-4 from the access probe transmission 1 1002 have been correctly received by the base station 300.

At 820, the wireless device 200 may retransmit the plurality of frames based on the receipt of the selective acknowledgement. In one aspect of the disclosed approach, the retransmission of the frames includes the retransmission of the set of frames at a higher power. As illustrated in FIG. 10, the selective acknowledgement message 1 1012 includes the bits 1012-1 and 1012-4 each set to "1" to indicate that the access probe frames APF0 and APF3 have been correctly received by the base station 300. Thus, the wireless device 200 may retransmit only APF1 1004-1 and APF2 1004-2 in an access probe transmission 2 1004 to the base station 300. It should be noted that if the wireless device determines that no acknowledgement has been received from the base station 300, then it may retransmit all frames in the plurality of frames as a default.

Once the access probe frames that have not been correctly received by the base station 300 have been retransmitted by the wireless device 200, then operations may return to 804, where it may be determined if the retransmitted access probe frames have been correctly received by the base station 300. It should be noted that a loop of operations from 804, 810, and 820 may repeat until the wireless device 200 has determined that the access probe frames have been completely received by the base station 300, as described above.

At 924, the base station 300 may receive a retransmission of another set of frames associated with the access probe message. In one aspect of the disclosed approach, the other set of frames consist of only frames not previously correctly received. As illustrated by the example in FIG. 10, the base station 300 may receive only the access probe frames APF1 1004-1 and APF2 1004-2 in the access probe transmission 2 1004 sent by the wireless device 200, which were the access probe frames that were not received in the example described at 904.

Once the retransmitted access probe frames have been received, operations may then return to 904, where, as described above, it is determined if each access probe frame that has been received may be decoded properly by the base station 300. Operations then continue as described at 906 and 910. It should be noted that a loop including 904, 906, 910, and 920-924 may repeat until all the access probe frames for the access probe message has been correctly received, and the access probe message has been reassembled.

Continuing with the example in FIG. 10, assuming that the access probe frames APF1 1004-1 and APF2 1004-2 have been received correctly, the access probe frames APF1 1004-1 and APF2 1004-2 are stored in buffer slots APF1 1056-2 and APF2 1056-3 of the buffer 380, respectively, as buffer state 3 1056 illustrates. Operations may then continue at 910, where it is determined that the access probe message is complete. Operations may then continue at 930.

At 930, the base station 300 may reassemble the access probe message based on the correctly received access probe frames. As illustrated in FIG. 10, the access probe message may be reassembled from the buffered access probe frames APF0 1056-1 through APF 1056-4. Once the access probe frame has been reassembled, operations may continue at 932.

At 932, the base station 300 may transmit an acknowledgement that all access probe frames have been correctly received. In one aspect of the disclosed approach, as illustrated in FIG. 10, the acknowledgment message may indicate all access probe frames have been received correctly, as shown in an ACK message 2 1014, where each of the bits in the bitmask, including bits 1014-1 through 1014-4, are each set to "1" to indicate that the access probe frames APF0 through APF3 have been correctly received by the base station 300. In another aspect of the disclosed approach, the acknowledgement may simply include an indication or information that indicates all access probe frames have been received correctly. As a non-limiting example, a binary bit may be used to indicate that all access probe frames have been correctly received.

Once the base station 300 transmits the acknowledgement, the wireless device 200 may determine at 804 that an acknowledgement may be received, and then operation may continue at 810, where the wireless device 200 may determine that all access probe frames have been correctly received by the base station 300. If all the access probe frames have been correctly received, then operations may end.

The disclosed approach may provide for reduced redundant reverse link transmission, reduced interference levels at the base station 300, and power saving at the wireless device 200 as a by-product of less transmission attempts. Further, the disclosed approach may be backward compatible in the sense that without the selective acknowledgement message, the system works as usual, and the selective acknowledgement message itself may be skipped to avoid disrupting other more critical channels.

It may be desirable for the implementation of the selective acknowledgement feature to be optional for the various devices of the system, which provides for greater flexibility. Hence, any base station or wireless device may operate in the system—whether or not it supports selective acknowledgement. In one aspect of the disclosed approach, provision of signaling of selective acknowledgement capability for both base stations and wireless devices may allow interoperability with nodes that do not implement selective acknowledgement. Specifically, by providing capability signaling in base stations and wireless devices that support SACK messaging, the various aspects of the disclosed approach may operate with legacy base stations and wireless devices.

Also, by providing a base station re-assembly engine that may use identifying information assigned by the base station 300 to each wireless device that allows the base station 300 to track which access probe transmissions containing partial APF are associated with which wireless device, the base station 300 may be able to operate with multiple wireless devices.

Figure 11:
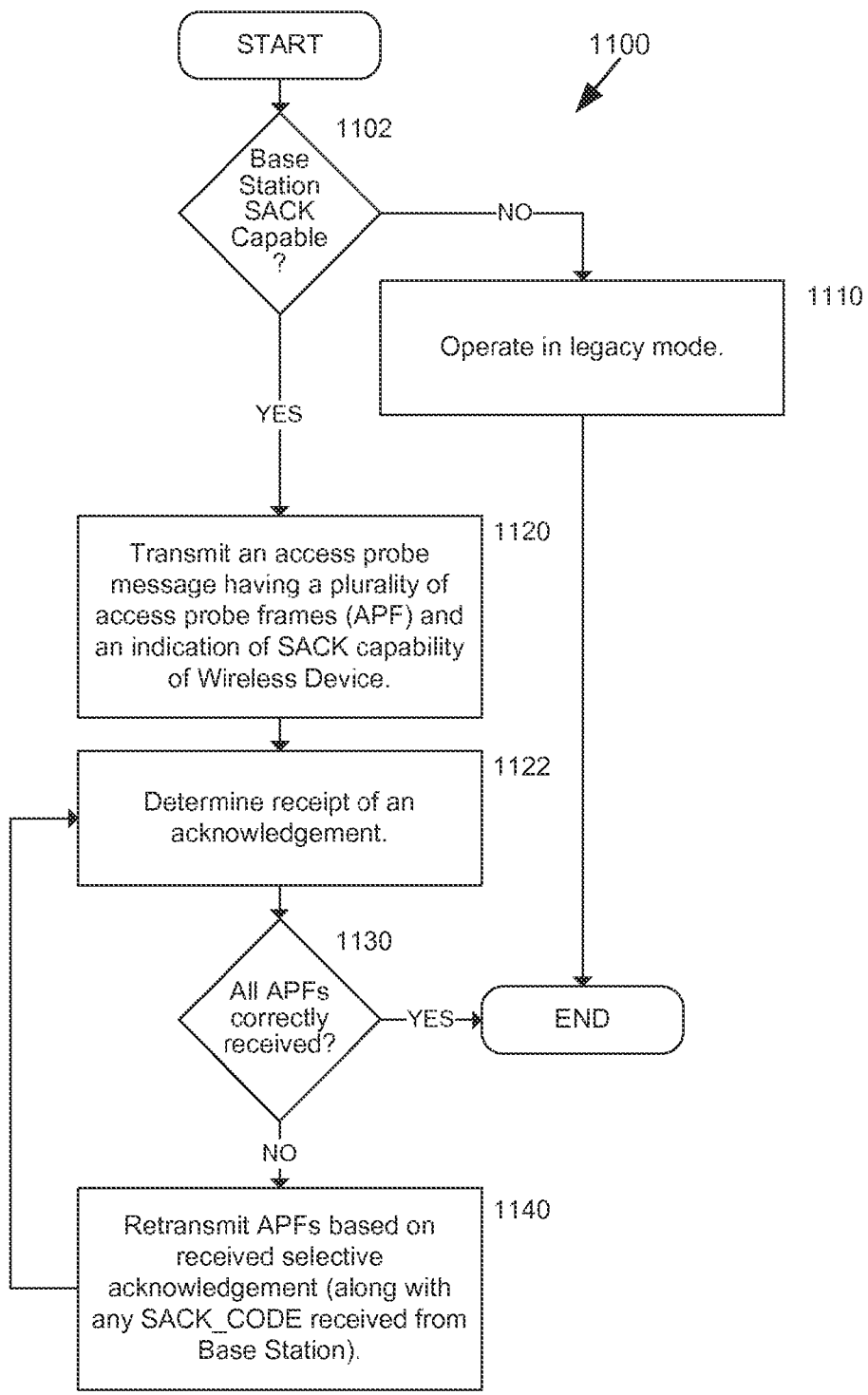
FIG. 11 is a flow diagram of a second selective acknowledgement approach for access probes for the wireless device of FIG. 2 according to some embodiments.
Figure 12:
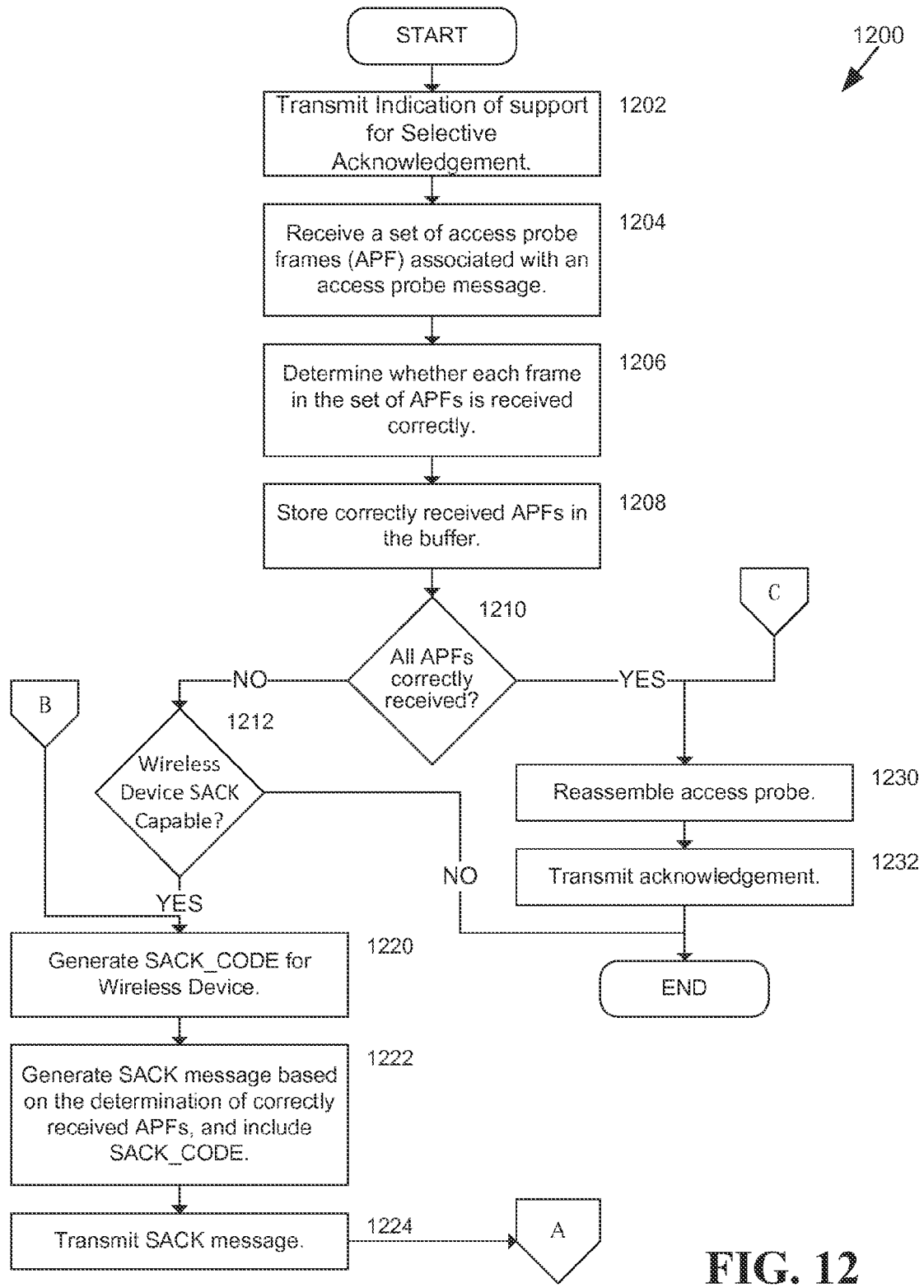
FIG. 12 is a first portion of a flow diagram of a selective acknowledgement approach for access probes for the base station of FIG. 3 according to some embodiments.
Figure 13:
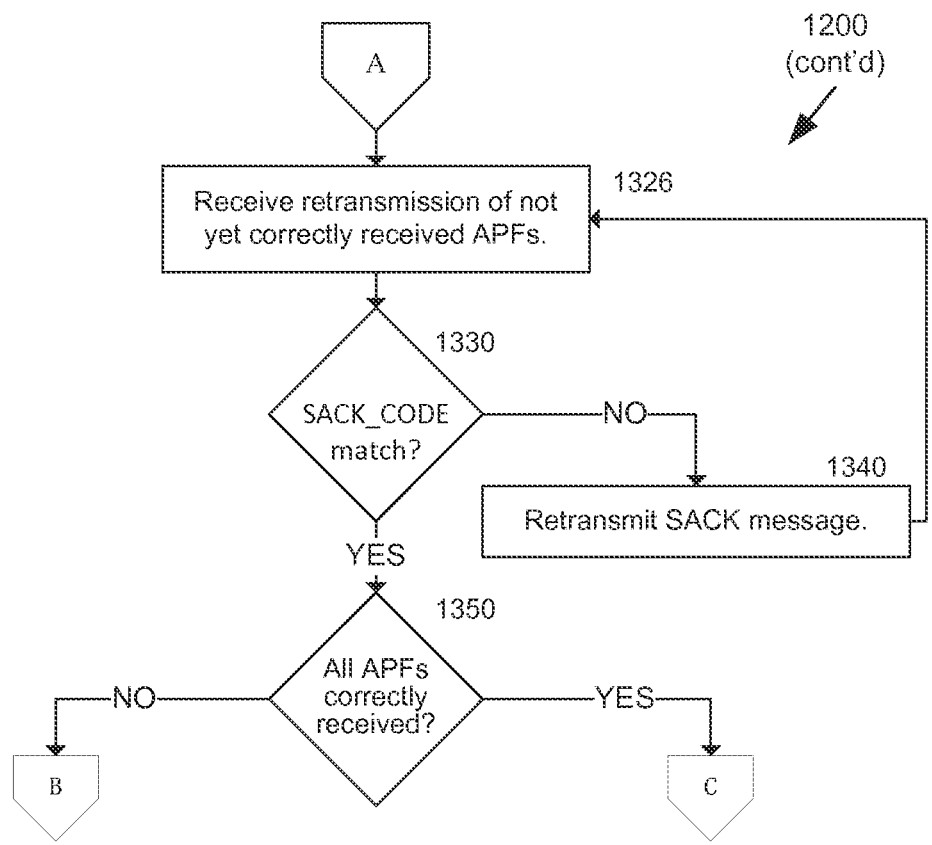
FIG. 13 is a second portion of the flow diagram of FIG. 12 according to some embodiments.

Referring to FIG. 11, which illustrates a second selective access probe acknowledgement process 1100 for a wireless device such as the wireless device 200; FIGS. 12 and 13, which illustrate a second selective access probe acknowledgement process 1200 for a base station such as the base station 300; and FIG. 14, which illustrates a non-limiting example of a call flow 1400 for an access probe transmission between the wireless device 200 and the base station 300; various aspects of the access probe acknowledgement approach will be described herein.

At 1202, the base station 300 may inform the wireless device 200 of SACK support by the base station 300 through a configuration message or an indication such as a SACK capability message 1402. The base station 300 may broadcast the SACK capability message 1402 to a number of wireless devices 200. In one aspect of the disclosed approach, the SACK capability message may be a part of a General Access Parameter Message (GAPM), where a bit may be added to the GAPM to signal whether selective acknowledgement is supported at the base station 300. The GAPM may also provide signaling of other capabilities of the base station 300. The signaling may be performed through a broadcast of the GAPM by the base station 300 to a plurality of wireless devices, which may include wireless device 200. It should be noted that wireless devices and base stations that do not support SACK operations are referred to herein as "legacy wireless devices," "legacy base stations," or "legacy devices." In the case of legacy wireless devices, which may not be able to read the GAPM (even though they may receive it)—effectively not being able to decode the capability bit, the base station 300 may still operate with them in a non-SACK mode. Thus, the use of the SACK capability message 1402 may allow the various aspects of the disclosed approach to be backward compatible with legacy wireless devices.

At 1102, the wireless device 200 may determine if the base station 300 includes SACK capability. In one aspect of the disclosed approach, this determination may be based on the SACK capability message 1402 received from the base station 300. If the wireless device 200 determines that the base station 300 supports SACK, then operation may continue at 1120. Otherwise, operation may continue at 1110.

At 1110, where the wireless device 200 determines that the base station 300 does not support SACK, then the wireless device 200 may operate in a non-SACK mode, also referred to herein as a "legacy mode".

Figure 14:
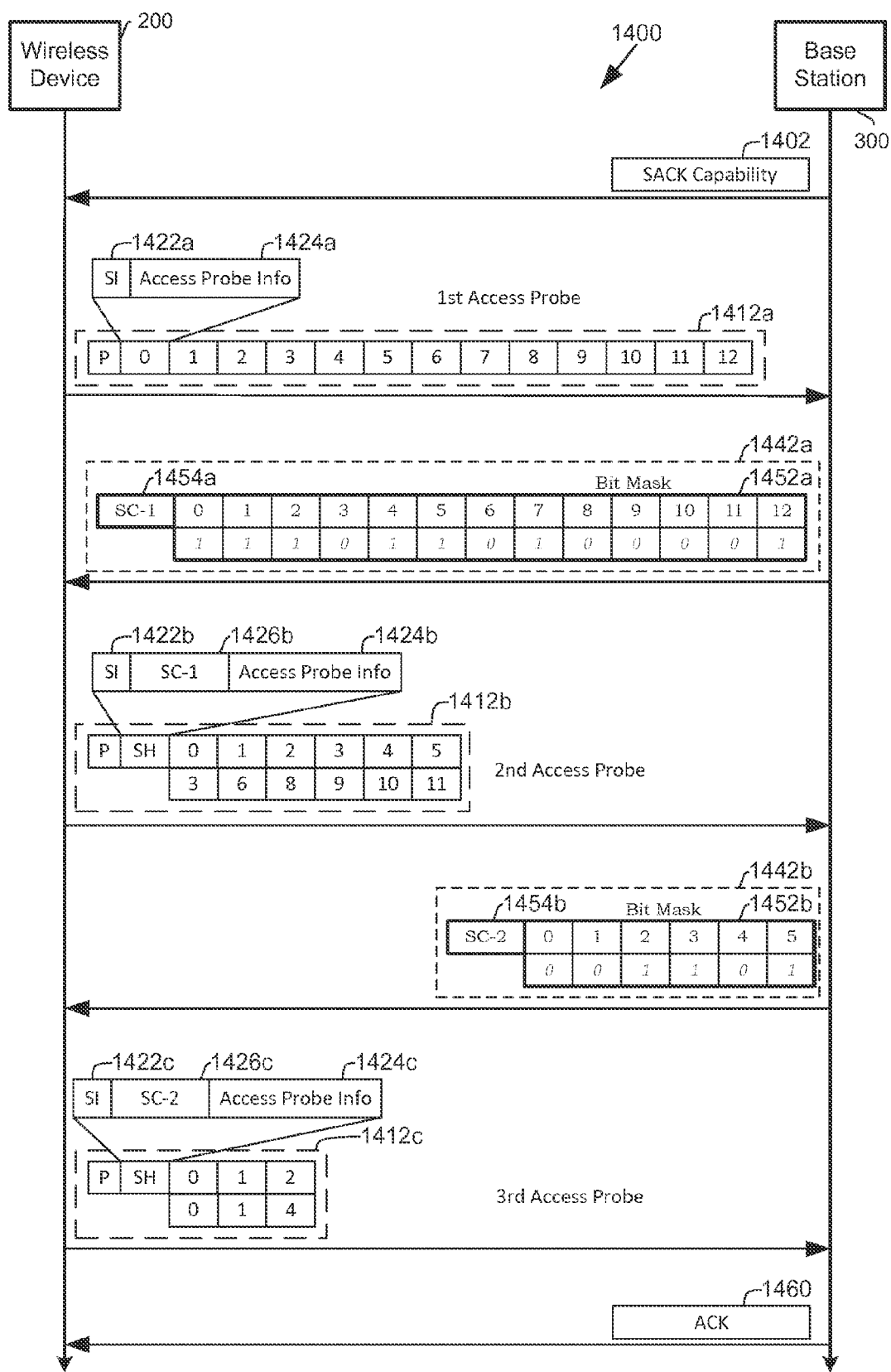
FIG. 14 is a message exchange flow diagram illustrating an example of the operation of FIGS. 11, 12, and 13 according to some embodiments.

At 1120, where the wireless device 200 determines that the base station 300 supports SACK, then the wireless device 200 may transmit an access probe message 1412a, as illustrated in FIG. 14, having a plurality of APFs 0-12, to the base station 300. The access probe message 1412a may also include a preamble portion before the plurality of APFs 0-12.

The APFs 0-12 are similar to APF0 1002-1 through APF3 1002-4 of FIG. 10. The access probe transmission 1412a includes Reverse Enhanced Access Channel (R-EACH) data frames that are transmitted from the wireless device 200—a portion of which may be used to indicate support for SACK in each access attempt by the wireless device 200. In one aspect of the disclosed approach, a Segmentation Indicator (SI) field 1422a in the R-EACH data frame, which is the first two bits of the frame, may be used by the wireless device 200 to provide an indication for SACK support. By way of example, currently these first two bits are set to the value of '00' by default. The wireless device 200 may thus use the value of '01' when the wireless device 200 decides to indicate to the base station 300 that it supports selective acknowledgement after the wireless device 200 determines that the base station 300 supports SACK from reading the GAMP capability bit transmitted from the base station 300, as discussed above. The decision of whether to operate in SACK mode and provide selective acknowledgement in access probes may be made by the wireless device 200 for each access attempt. It follows that the wireless device 200 may not send an SI with a value of '01' to base stations that do not support selective acknowledgement such that these base stations may not unexpectedly see an R-EACH with an "invalid" value in the SI. However, when a base station that supports SACK such as the base station 300 sees the value of '01' in the SI field in an R-EACH data frame, the base station may determine that the wireless device supports selective acknowledgement in this access attempt, so the base station may transmit a SACK message to the wireless device in response to the R-EACH data frame if any part of the access probe is not received. It further follows that the wireless device 200 may not unexpectedly receive a SACK message if it does not indicate support for selective acknowledgement in an access attempt. Thus, the base station 300 may indicate that it supports SACK by advertising or broadcasting its SACK capabilities, but the wireless device 200 may decide whether to operate in the SACK mode by signaling its capability to support SACK operations in the access probe the wireless device 200 transmits.

Each R-EACH data frame may also contain an access probe info portion 1424a that provides information regarding the access probe message 1412a. In one aspect of the disclosed approach, the access probe info portion 1424a includes a mobile ID field, which may provide information that identifies the wireless device 200, and an access probe length field, which may provide size information of the access probe transmission 1412a, including the number of frames in the access probe message 1412a.

It should be noted that if the base station 300 does not receive frame 0, then the base station 300 may not be able to determine the SACK capability and, just as importantly, the mobile ID, of the wireless device 200, and may not be able to respond to the wireless device 200, and the wireless device 200 may thus have to retransmit the complete access probe again.

At 1204, the base station 300 may receive a set of frames associated with the access probe message 1412a from the wireless node 200. The base station 300 may also receive the SACK capability of the wireless device 200 as transmitted from the wireless node 200 using the SI 1422a. Operations may then continue at 1206.

At 1206, the base station 300 may determine whether each frame in the set of frames from the access probe message 1412a is received correctly, and buffer the correctly received frames at 1208. These operations have been discussed with regard to the operation of the base station 300 described at 904 and 906, respectively, of FIG. 9, and will not be described again to avoid duplication of material that has already been disclosed.

At 1210, it is determined if all APFs are correctly received by the base station 300. If so, then operation continues at 1230. Otherwise, operation continues at 1212. In the illustrated example, although the plurality of access probe frames APF 0-12 has been transmitted by the wireless node 200, the set of frames that is detected by the base station 300 only includes R-EACH frames 0, 1, 2, 4, 5, 7, and 12. Thus, because not all APFs have been correctly received, operation may continue at 1212.

At 1212, the base station 300 may determine if the wireless device 200 supports SACK. In one aspect of the disclosed approach, the base station 300 will determine this by examining the SI field 1422a as sent by the wireless device 200, as discussed above. If the wireless device 200 supports SACK, then operation may continue at 1220. Otherwise, if the wireless device 200 does not support SACK, then the base station 300 may not transmit an acknowledgement because not all APFs have been received correctly. In other words, the base station 300 may operate in the legacy mode of access probe acknowledgement.

At 1220, if the wireless device 200 supports SACK, then the base station 300 may generate an identifier or identification code such as a selective acknowledgement code (SACK_CODE) that is a unique identification for the wireless device 200 that may assist the base station 300 in correctly assembling the access message transmitted by the wireless device 200, as further described herein. In one aspect of the disclosed approach, the SACK_CODE may be of a size of 8-bits, as this can handle up to 256 accesses at the same time.

At 1222, the base station 300 may generate an acknowledgement based on the determination at 1210. In one aspect of the disclosed approach, the acknowledgement is a SACK message 1442a that includes an indication of receipt for only the set of frames in the plurality of frames that are correctly received, as well as the SACK_CODE generated at 1220. As illustrated in FIG. 14, the SACK message 1442a may include a SACK-CODE 1 (SC-1) 1454a, and a bitmask 1452a including bits 0-12, where the bits 0, 1, 2, 4, 5, 7, and 12 are set to "1" to indicate that APFs 0, 1, 2, 4, 5, 7, and 12 have been correctly received by the base station 300. The bitmask 1452a may be variable in length based on the number of frames being acknowledged. In another aspect of the disclosed approach, the SACK message 1442a may identify only the access probe frame up to which the transmitted plurality of access probe frames have been correctly received by the base station 300. The wireless device 200 may then retransmit only the access probe frames after the access probe frame identified in the SACK message 1442a of the other aspect of the disclosed approach. In still yet another aspect of the disclosed approach, the SACK message 1442a may identify only the frames that are still needed. In general, as discussed above, the SACK message 1442a may optimize the retransmission of the access probe frames by indicating to the wireless device 200 what access probe frames need to be retransmitted. Even more generally, the SACK message 1442a may allow the wireless device 200 to avoid retransmission of all access probe frames upon the failure of a correct receipt of any one of the access probe frames. Once the SACK message 1442a has been generated, operations may then continue at 1224.

In order to provide the SACK mode of operation, the base station 300 may need to assemble all data frames from different access probe transmissions from each wireless device together in the original order. It should be noted that the base station 300 may not lose track of the APFs transmitted from different wireless devices because this will result in incorrectly decoded access probes. In one aspect of the disclosed approach, the design of the bitmask may be used to put the R-EACH data frames from different access probe transmissions in the right order.

As an example to explain the various aspects of the bitmask design presented herein, assume an R-EACH message has a total of N data frames. The base station 300 may provide selective acknowledgement only if it knows the mobile ID and the length of an access attempt, i.e., some (the first one or more) data frames have to be decoded for the selective acknowledgement message to be generated. Thus, the base station 300 needs to maintain a re-assembly buffer of length N. Assume there are M data frames in an initial access probe. In an initial acknowledgement, the length of the bitmask is the same as the total number of data frames in the access attempt. In a subsequent retransmission, since the wireless device may only re-transmit failed data frames, the bitmask length may be shorter. Thus, N=M in the beginning, and M may become shorter in each subsequent access probe because the wireless device may only need to re-transmit the data frames not successfully received by the base station 300. Consequently, the base station 300 may return a bitmask of length M to the wireless device 200 in the SACK message 1442a. Similar to the approach discussed above with respect to FIG. 10, the base station 300 may maintain "gaps" in the re-assembly buffer if a particular data frame is not received. If a data frame is received in a later transmission, it may fill in the gap. However, the above algorithm works only if we know for sure that there is only one mobile accessing the base station at a time, which is not necessarily true.

When multiple mobiles are accessing the base station 300 using the SACK mode, the base station 300 needs to know which re-assembly buffer corresponding to a particular access attempt that the newly received R-EACH data frame shall be filled in. Normally, the wireless device 200 may transmits a mobile ID in the first frame, a frame 0, of the transmission, as in the access probe information field 1424*a*. In subsequent re-transmissions, the wireless device 200 may not transmit the mobile ID again because frame 0 has already been received, and it is not desirable from a data resource perspective to retransmit this information. However, the lack of a mobile ID in the retransmissions means that the mobile ID cannot be used to re-assemble the retransmitted APFs.

In one aspect of the disclosed approach, the SACK_CODE is introduced to guide the base station 300 in re-assembling the received retransmissions of the APFs from the wireless device 200. Specifically, in a re-transmission of any frames as necessitated by the receipt of the SACK message from the base station 300, the wireless device 200 may embed the SACK_CODE in the transmission of a new access probe transmission, as further described herein. In the new access probe transmission, when the base station 300 sees the SACK_CODE, it may determine which re-assembly buffer the frames of this new access probe goes to. The use of the SACK_CODE provides for the proper reassembly of the access probe.

Use of the SACK_CODE may also assist in solving such issues as when a SACK message is not received by the wireless device 200. In one aspect of the disclosed approach, in the same access attempt for the wireless device 200, the base station 300 may pick a different SACK_CODE and assign it to the wireless device 200 as it transmits the SACK message for each round. The wireless device 200 may then use the latest SACK_CODE during its response to the SACK message. Thus, for each SACK message (base station 300)/APF retransmission (wireless device 200) pair, a different SACK_CODE may be used. Referring to FIG. 14, a first SACK_CODE may be generated by the base station 300 and sent to the wireless device 200 in the SACK message 1442*a*, the code being illustrated as SC-1 1454*a*. The wireless device 200 may then use the first assigned SACK_CODE (i.e., SC-1 1454*a*) to accompany its re-transmittal of the APFs in a second access probe transmission 1412*b*, as further detailed herein. Then, if the base station 300 needs to send another SACK to reply to the retransmission by the wireless device 200, it may generate a second SACK_CODE, such as the code illustrated as SC-2 1454*b*, to be sent to the wireless device 200 in a second SACK message 1442*b*. The wireless device 200 may then use the second assigned SACK_CODE (i.e., SC-2 1454*a*) to accompany its re-transmittal of the APFs in a third access probe transmission 1412*c*, as further detailed herein. Upon receipt of each new access probe transmission that includes a SACK_CODE, the base station 300 may be able to match up the corresponding wireless device, and subsequently the buffer for which the retransmitted APFs are meant, with the list of previously stored SACK_CODEs and their respective assignments.

If a SACK_CODE is lost such that a wireless device does not receive the latest SACK message, any retransmission from the wireless device may be with the previous SACK_CODE. When a base station sees the older SACK_CODE instead of the latest one, it will know that the latest SACK message was lost. The base station knows what the "gaps" are for that transmission, and may still correctly fill them with the new access probe. In one aspect of the disclosed approach, one round of history of SACK_CODEs may be sufficient. For example, if the wireless device 200 did not receive the second SACK message 1442*b* from the base station 300, and therefore was unaware of the second SACK_CODE SC-2 1454*b*, the wireless device 200 may retransmit the second access probe transmission 1412*b*, which contains the "old" SACK_CODE SC-1 1426*b*. The base station 300 may then realize, upon determining that the SACK_CODE sent by the wireless device 200 is not the second SACK_CODE SC-2 1454*b* but the first SACK_CODE SC-1 1454*a*, that the wireless device 200 did not receive the second SACK message 1442*b*. The base station 300 may still make use of the retransmitted APFs, as it contains frames that it did not receive before. Thus, even though there is some resource waste due to the wireless device 200 retransmitting certain APFs that did not need to be retransmitted (e.g., original APFs 8, 9, and 11 were correctly received by the base station 300, as noted by the second SACK message 1442*b* that the wireless device 200 did not receive), the base station 300 may still attempt to reconstruct any APFs it is missing (e.g., original APFs 3, 6, and 10) for the wireless device 200 from this retransmission.

At 1224, the SACK message 1442*a* is transmitted by the base station 300 to the wireless device 200. In one aspect of the disclosed approach, the SACK message may be transmitted in a page channel and may include the bitmap indicating exactly which access probe frames have been correctly received (i.e., received and decoded properly) as well as the SACK-CODE.

At 1122, the wireless device 200 may determine whether a SACK message associated with a subset of frames in the plurality of frames may be received from the base station 300. As further described herein, after such a SACK message is received at the wireless device 200, the access probe frames that have been correctly received by the base station 300 may not be transmitted in the next access probe. Therefore, the next access probe may only contain new information and redundant transmission may be reduced or eliminated. As a result, future access probes may be shorter. In the example illustrated in FIG. 14, the wireless station 200 may receive the SACK message 1442*a* transmitted by the base station 300 at 1224. Operation may then continue at 1130.

At 1130, the wireless device 200 may determine whether a SACK message associated with the plurality of frames is received from the base station 300. In general, a wireless device that supports SACK operation in an access attempt may monitor for a SACK message from the base station. In one aspect of the disclosed approach, as described above, the acknowledgement message may be a SACK message that indicates that not all access probe frames have been correctly received by the base station 300—i.e., the SACK message may identify only the access probe frames that have been correctly received. In this case, operations may continue at 1140. In another aspect of the disclosed approach, the acknowledgement message may indicate that all access probe frames have been correctly received by the base station 300. In that case, operations may end with regard to the access probe acknowledgement. In the example illustrated in FIG. 14, the wireless station 200 may receive the SACK message 1442*a* transmitted by the base station 300 at 1224, where the SACK message 1442*a* is associated with a subset of the plurality of frames. Namely, the SACK message 1442*a* indicates that the access probe frames APFs 0, 1, 2, 4, 5, 7, and 12 from the access probe transmission 1412*a* have been correctly received by the base station 300.

At 1140, the wireless device 200 may retransmit the plurality of frames based on the receipt of the SACK message 1442*a*. As illustrated in FIG. 14, the wireless device 200 may retransmit only APFs 3, 6, and 8-11 in the second access probe transmission 1412*b* to the base station 300. It should be noted that if the wireless device 200 determines that no acknowledgement has been received from the base station 300, then it may retransmit all frame in the plurality of frames as a default. Further, the wireless device 200 may include a sack header (SH) portion in the second access probe transmission 1412*b*. The SH portion includes an SI portion 1422*b*, a SC-1 portion 1426*b*, and an access probe info portion 1424*b*.

In one aspect of the disclosed approach, the SH portion uses the same frame structure as a normal R-EACH data frame. Thus, the base station has no problem decoding the same frame structure and no new hardware design is needed. Specifically, no re-segmentation/re-encoding/re-modulation may be needed, thus it may be easier to implement the responses to the selective acknowledgement messages at the wireless device 200 and to re-assemble the retransmitted access probe frames at the base station 300.

As discussed above, in one aspect of the disclosed approach, the first two bits of a frame, which is the SI portion 1422*b*, may be set to a pattern of '10'. This is a special pattern used so that the frame may be distinguished from a legacy R-EACH data frame (with SI='00') and a new R-EACH data frame indicating SACK support (with SI='01'). The SH may include a SACK_CODE from the SACK message, which in this example is the SC-1 1454*a* from the SACK message 1442*a* transmitted by the base station 300. The rest of the second access probe transmission 1412*b* may contain the R-EACH data frames that are not yet correctly received, which are the APFs 3, 6, and 8-11 mentioned above. It should be noted that the indices for the APFs may be renumbered based on base APF index of 0. Thus, as illustrated in FIG. 14, the APFs for transmitting APFs 3, 6, and 8-11 are referenced by APF index 0-5.

Once the access probe frames that have not been correctly received by the base station 300 have been retransmitted by the wireless device 200 along with SC-1 1426*b* (the SACK_CODE assigned by the base station 300), then operations may return to 1122, where it may be determined if the retransmitted access probe frames have been correctly received by the base station 300. It should be noted that a loop of operations from 1122, 1130, and 1140 may repeat until the wireless device 200 has determined that the access probe frames have been completely received by the base station 300, as described above.

Returning to 1224, after the base station 300 has transmitted the SACK message, the base station 300 may receive a retransmission of another set of frames associated with the access probe message at 1326 of FIG. 13. In one aspect of the disclosed approach, this other set of frames may consist of only frames not previously correctly received, which may be APFs 3, 6, and 8-11.

Once the second access probe message 1412*b*, which contains the APFs retransmitted by the wireless device 200, has been received by the base station 300, operations may continue with 1330, where it is determined if the SACK_CODE received in the SC-1 portion 1426*b* is the same SACK_CODE as assigned by the base station 300 in the last SACK message transmission. Continuing with the example shown in FIG. 14, it is determined if the SACK_CODE received is equivalent to the SC-1 portion 1454*a* of the SACK message 1442*a*. If so, then operation continues at 1350. Otherwise, operation continues at 1340.

At 1340, if the SACK_CODE received by the base station 300 is not the one most previously sent by the base station 300 to the wireless device 200, then the base station 300 may retransmit the last SACK message under the assumption that wireless device 200 did not receive the latest SACK message and transmitted an access probe message that is identical to the last access probe message, containing the APFs that the wireless device 200 assumes that so far have not been correctly received by the base station 300. In another embodiment, the base station 300 may generate a new SACK message (e.g., a second SACK message) based on the processing of the retransmission of the access probe message. In yet another aspect of the disclosed approach, if there is no match to any SACK_CODE previously assigned by the base station 300, then the base station 300 may choose to ignore the access probe message.

If the SACK_CODE of the latest access probe message matches at 1330, then operation may continue at 1350, where it is determined if each access probe frame that has been received may be decoded properly by the base station 300. Operations then returns to FIG. 12 as described at 1230, if all the APFs have been correctly received, or at 1212, if all APFs are not correctly received. It should be noted that a loop including 1220, 1222, 1224, 1326, 1330, and 1350, may repeat until all the access probe frames for the access probe message has been correctly received. Then the probe message may be reassembled at 1230 and an ACK message transmitted by the base station 300 at 1232.

Continuing with the example in FIG. 14, assuming that the access probe frames APFs 2, 3, and 5 from the access probe message 1412*b* sent by the wireless device 200 have been received correctly, the base station 300 may transmit the second SACK message 1442*b* that indicates these APFs have been correctly received, as well as a second SACK_CODE (SC-2) 1454*b* generated to replace the SC-1 1454*a*. The second SACK message 1442*b* will have a value of "1" for the positions of APFs 2, 3, and 5, and "0" otherwise (i.e., for the positions of APFs 0, 1, and 4) to indicate that the base station 300 received APFs 2, 3, and 5 correctly. It should be noted that although the information contained in these APFs represent original APFs 8, 9, and 11 in the access probe message 1412*a*, the wireless device 200 and base station 300 have re-indexed the reference to these frames as they may be sequentially used to fill in the buffer, which are empty for these previous frames.

Assuming that a third access probe message 1424*c* transmitted by the wireless device 200 is successful in completing the missing APFs at the base station 300, as shown by APFs 0-2 of the third access probe message 1424*c*, then operation may continue at 1230.

At 1230, the base station 300 may reassemble the access probe message based on the correctly received access probe frames. As illustrated in FIG. 14, the access probe message may be reassembled from the buffered APFs from the access probe messages 1412*a*-1412*c*. Once the access probe frame has been reassembled, operations may continue at 1232.

At 1232, the base station 300 may transmit an acknowledgement to the wireless device 200 in the form of an ACK message 1460 that all access probe frames have been correctly received. In one aspect of the disclosed approach, as illustrated in FIG. 14, the acknowledgment message may indicate all APFs have been received correctly by explicitly indicating so using a bit for each APF, where each of the bits in the bitmask is set to "1" to indicate that the APFs have been correctly received by the base station 300. In another aspect of the disclosed approach, the acknowledgement may simply include information that indicates all access probe frames have been received correctly. As a non-limiting example, a single binary bit may be used in this latter aspect to indicate that all access probe frames have been correctly received.

Once the base station 300 transmits the acknowledgement, the wireless device 200 may determine at 1122 that an acknowledgement may be received, and then operation may continue at 1130, where the wireless device 200 may determine that all access probe frames have been correctly received by the base station 300. If all the access probe frames have been correctly received, then operations may end.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the disclosed approach. The algorithms described herein may also be efficiently implemented in software and/or embedded in hardware.

In the description, elements, circuits, and functions may be shown in block diagram form in order not to obscure the disclosed approach in unnecessary detail. Conversely, specific implementations shown and described are exemplary only and should not be construed as the only way to implement the disclosed approach unless specified otherwise herein. Additionally, block definitions and partitioning of logic between various blocks is exemplary of a specific implementation. It is readily apparent to one of ordinary skill in the art that the disclosed approach may be practiced by numerous other partitioning solutions. For the most part, details concerning timing considerations and the like have been omitted where such details are not necessary to obtain a complete understanding of the disclosed approach and are within the abilities of persons of ordinary skill in the relevant art.

Also, it is noted that the aspects may be described as a process that is depicted as a flow diagram, a call flow diagram, a structure diagram, or a block diagram (collectively and generally, a "flowchart"). Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, an algorithm, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosed approach may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, aspects may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing aspects described herein, is considered a special purpose processor for carrying out such aspects. Similarly, a general-purpose computer is considered a special purpose computer when configured for carrying out aspects described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing aspects are merely examples and are not to be construed as limiting the invention. The description of the aspects is intended to be illustrative, and not to limit the scope of the claims. As such, the present teachings can be readily applied to other types of apparatuses and many alternatives, modifications, and variations will be apparent to those skilled in the art.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications comprising:
   transmitting, to a wireless node, an access probe message comprising a reverse pilot channel transmission, and further comprising a plurality of frames;
   determining whether a selective acknowledgement associated with a subset of frames in the plurality of frames is received from the wireless node before the wireless node acknowledges successful receipt of the access probe message,
   wherein the selective acknowledgement comprises an indication of receipt by the wireless node for at least one frame in the subset of frames; and
   retransmitting the plurality of frames based on the receipt of the selective acknowledgement.

2. The method of claim 1, wherein each frame in the plurality of frames comprises an error detection code configured to allow the wireless node to determine whether a frame is communicated without error.

3. The method of claim 1, wherein the indication of receipt in the selective acknowledgement comprises a bitmask.

4. The method of claim 3, wherein the retransmitting of at least a portion of the plurality of frames comprises retransmitting all frames not yet received successfully as indicated in the bitmask.

5. The method of claim 1, wherein the retransmitting of at least a portion of the plurality of frames comprises retransmitting the plurality of frames using a higher power.

6. The method of claim 1, wherein the retransmitting of at least a portion of the plurality of frames comprises retransmitting all frame in the plurality of frames based on a determination that no acknowledgement associated with the subset of frames is received.

7. A method for wireless communications comprising:
   receiving, from a wireless node, a capability message that the wireless node supports selective acknowledgement of receipt of transmission of a subset of frames in a plurality of frames associated with an access probe message comprising a reverse pilot channel transmission;
   transmitting, to the wireless node, the plurality of frames along with an indication of support for selective retransmission of the plurality of frames based on a selective acknowledgment message;
   determining whether a first selective acknowledgement message is received from the wireless node before the wireless node acknowledges successful receipt of the access probe message,
   wherein the first selective acknowledgement message comprises an indication of receipt by the wireless node for at least one frame in the subset of frames; and
   retransmitting the plurality of frames based on the receipt of the first selective acknowledgement message.

8. The method of claim 7, wherein the retransmitting the plurality of frames based on the receipt of the first selective acknowledgement message comprises:
   receiving, from the wireless node, an identification code for identifying the plurality of frames to be retransmitted; and
   transmitting the identification code along with the plurality of frames based on the receipt of the first selective acknowledgement message.

9. The method of claim 8, further comprising:
   determining whether a second selective acknowledgement message is received from the wireless node, wherein the second selective acknowledgement message comprises a second indication of receipt by the wireless node for the plurality of frames transmitted based on the receipt of the first selective acknowledgement message and a second identification code for identifying a separate plurality of frames to be retransmitted; and
   transmitting the second identification code along with the plurality of frames based on the receipt of the second selective acknowledgement message.

10. The method of claim 7, wherein the indication of receipt in the acknowledgement comprises a bitmask.

11. The method of claim 10, wherein the retransmitting of the plurality of frames comprises retransmitting all frames not yet received successfully as indicated in the bitmask.

12. The method of claim 7, wherein the retransmitting the plurality of frames comprises transmitting the subset of the plurality of frames in a new access probe transmission, wherein the subset of the plurality of frames comprise a non-sequential set of frames from the plurality of frames.

13. The method of claim 7, wherein the retransmitting of the plurality of frames comprises retransmitting the plurality of frames using a higher power.

14. The method of claim 7, wherein the retransmitting of at least a portion of the plurality of frames comprises retransmitting all frame in the plurality of frames based on a determination that no acknowledgement associated with the subset of frames is received.

15. An apparatus for wireless communications comprising:
means for receiving, from a wireless node, a capability message that the wireless node supports selective acknowledgement of receipt of transmission of a subset of frames in a plurality of frames associated with an access probe message comprising a reverse pilot channel transmission;
means for transmitting, to the wireless node, the plurality of frames along with an indication of support for selective retransmission of the plurality of frames based on a selective acknowledgment message;
means for determining whether a first selective acknowledgement message is received from the wireless node before the wireless node acknowledges successful receipt of the access probe message, wherein the first selective acknowledgement message comprises an indication of receipt by the wireless node for at least one frame in the subset of frames; and
means for retransmitting the plurality of frames based on the receipt of the first selective acknowledgement message.

16. The apparatus of claim 15, wherein the means for retransmitting the plurality of frames based on the receipt of the first selective acknowledgement message comprises:
means for receiving, from the wireless node, an identification code for identifying the plurality of frames to be retransmitted; and
means for transmitting the identification code along with the plurality of frames based on the receipt of the first selective acknowledgement message.

17. The apparatus of claim 16, further comprising:
means for determining whether a second selective acknowledgement message is received from the wireless node, wherein the second acknowledgement message comprises a second indication of receipt by the wireless node for the plurality of frames transmitted based on the receipt of the first selective acknowledgement message and a second identification code for identifying a separate plurality of frames to be retransmitted; and
means for transmitting the second identification code along with the plurality of frames based on the receipt of the second selective acknowledgement message.

18. The apparatus of claim 15, wherein the indication of receipt in the acknowledgement comprises a bitmask.

19. The apparatus of claim 18, wherein the means for retransmitting of the plurality of frames comprises means for retransmitting all frames not yet received successfully as indicated in the bitmask.

20. The apparatus of claim 15, wherein the means for retransmitting the plurality of frames comprises means for transmitting the subset of the plurality of frames in a new access probe transmission, wherein the subset of the plurality of frames comprise a non-sequential set of frames from the plurality of frames.

21. The apparatus of claim 15, wherein the means for retransmitting of the plurality of frames comprises means for retransmitting the plurality of frames using a higher power.

22. The apparatus of claim 15, wherein the means for retransmitting of at least a portion of the plurality of frames comprises means for retransmitting all frame in the plurality of frames based on a determination that no acknowledgement associated with the subset of frames is received.

23. An apparatus for wireless communications comprising a transceiver configured to:
receive, from a wireless node, a capability message that the wireless node supports selective acknowledgement of receipt of transmission of a subset of frames in a plurality of frames associated with an access probe message comprising a reverse pilot channel transmission;
transmit, to the wireless node, the plurality of frames along with an indication of support for selective retransmission of the plurality of frames based on a selective acknowledgment message; and
a processing system configured to determine whether a first selective acknowledgement message is received from the wireless node before the wireless node acknowledges successful receipt of the access probe message, wherein the first acknowledgement message comprises an indication of receipt by the wireless node for at least one frame in the subset of frames,
wherein the transceiver is further configured to retransmit the plurality of frames based on the receipt of the first selective acknowledgement message.

24. The apparatus of claim 23, wherein the transceiver is further configured to:
receive from the wireless node, an identification code for identifying the plurality of frames to be retransmitted; and
transmit the identification code along with the plurality of frames based on the receipt of the first selective acknowledgement message.

25. The apparatus of claim 23, wherein:
the processing system is further configured to determine whether a second selective acknowledgement message is received from the wireless node, wherein the second acknowledgement message comprises a second indication of receipt by the wireless node for the plurality of frames transmitted based on the receipt of the first selective acknowledgement message and a second identification code for identifying a separate plurality of frames to be retransmitted; and
the transceiver is further configured to transmit the second identification code along with the plurality of frames based on the receipt of the second selective acknowledgement message.

26. The apparatus of claim 23, wherein the indication of receipt in the acknowledgement comprises a bitmask.

27. The apparatus of claim 26, wherein the transceiver is further configured to retransmit all frames not yet received successfully as indicated in the bitmask.

28. The apparatus of claim 23, wherein the transceiver is further configured to transmit the subset of the plurality of frames in a new access probe transmission, wherein the subset of the plurality of frames comprise a non-sequential set of frames from the plurality of frames.

29. The apparatus of claim 23, wherein the transceiver is further configured to retransmit the plurality of frames using a higher power.

30. The apparatus of claim 23, wherein the transceiver is further configured to retransmit all frame in the plurality of frames based on a determination that no acknowledgement associated with the subset of frames is received.

31. A computer-program product comprising:
a machine-readable storage medium comprising:
code for receiving, from a wireless node, a capability message that the wireless node supports selective acknowledgement of receipt of transmission of a subset of frames in a plurality of frames associated with an access probe message comprising a reverse pilot channel transmission;
code for transmitting, to the wireless node, the plurality of frames along with an indication of support for selective retransmission of the plurality of frames based on a selective acknowledgment message;
code for determining whether a first selective acknowledgement message is received from the wireless node before the wireless node acknowledges successful receipt of the access probe message, wherein the first selective acknowledgement message comprises an indication of receipt by the wireless node for at least one frame in the subset of frames; and
code for retransmitting the plurality of frames based on the receipt of the first selective acknowledgement message.

32. The computer-program product of claim 31, wherein the code for retransmitting the plurality of frames based on the receipt of the first selective acknowledgement message comprises:
code for receiving, from the wireless node, an identification code for identifying the plurality of frames to be retransmitted; and
code for transmitting the identification code along with the plurality of frames based on the receipt of the first selective acknowledgement message.

33. The computer-program product of claim 32, further comprising:
code for determining whether a second selective acknowledgement message is received from the wireless node, wherein the second acknowledgement message comprises a second indication of receipt by the wireless node for the plurality of frames transmitted based on the receipt of the first selective acknowledgement message and a second identification code for identifying a separate plurality of frames to be retransmitted; and
code for transmitting the second identification code along with the plurality of frames based on the receipt of the second selective acknowledgement message.

34. The computer-program product of claim 31, wherein the indication of receipt in the acknowledgement comprises a bitmask.

35. The computer-program product of claim 34, wherein the code for retransmitting of the plurality of frames comprises code for retransmitting all frames not yet received successfully in the bitmask.

36. The computer-program product of claim 31, wherein the code for retransmitting the plurality of frames comprises code for transmitting the subset of the plurality of frames in a new access probe transmission, wherein the subset of the plurality of frames comprise a non-sequential set of frames from the plurality of frames.

37. The computer-program product of claim 31, wherein the code for retransmitting of the plurality of frames comprises code for retransmitting the plurality of frames using a higher power.

38. The computer-program product of claim 31, wherein the code for retransmitting of at least a portion of the plurality of frames comprises code for retransmitting all frame in the plurality of frames based on a determination that no acknowledgement associated with the subset of frames is received.

* * * * *